(12) United States Patent
Kang et al.

(10) Patent No.: US 9,350,970 B2
(45) Date of Patent: May 24, 2016

(54) DISPARITY VECTOR DERIVATION

(71) Applicant: QUALCOMM Incorporated, San Diego, CA (US)

(72) Inventors: Jewon Kang, San Diego, CA (US); Ying Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 14/104,095

(22) Filed: Dec. 12, 2013

(65) Prior Publication Data

US 2014/0169474 A1     Jun. 19, 2014

Related U.S. Application Data

(60) Provisional application No. 61/737,639, filed on Dec. 14, 2012.

(51) Int. Cl.
*H04N 7/12*      (2006.01)
*H04N 13/00*    (2006.01)
*H04N 19/597*  (2014.01)
(Continued)

(52) U.S. Cl.
CPC .......... *H04N 13/0022* (2013.01); *H04N 19/105* (2014.11); *H04N 19/11* (2014.11); *H04N 19/156* (2014.11); *H04N 19/176* (2014.11); *H04N 19/44* (2014.11); *H04N 19/52* (2014.11); *H04N 19/55* (2014.11); *H04N 19/593* (2014.11); *H04N 19/597* (2014.11)

(58) Field of Classification Search
IPC .................................................... H04N 19/513
See application file for complete search history.

(56) References Cited

U.S. PATENT DOCUMENTS 8,532,411 B2   9/2013  Shimizu et al.
8,675,735 B2   3/2014  Shimizu et al.
(Continued)

FOREIGN PATENT DOCUMENTS

TW           262619         11/1995
TW           I259378         8/2006
(Continued)

OTHER PUBLICATIONS

An, et al., "3D-CE3.h related: Simplified inter-view merge candidate by reducing checking of reference lists", JCT-3V Meeting; Jul. 27-Aug. 8, 2013; Vienna; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0186, XP030131219, 2 pp.
(Continued)

*Primary Examiner* — Tracy Li
(74) *Attorney, Agent, or Firm* — Shumaker & Sieffert, P.A.

(57) ABSTRACT

A device performs a disparity vector derivation process to determine a disparity vector for a current block. As part of performing the disparity vector derivation process, when either a first or a second spatial neighboring block has a disparity motion vector or an implicit disparity vector, the device converts the disparity motion vector or the implicit disparity vector to the disparity vector for the current block. The number of neighboring blocks that is checked in the disparity vector derivation process is reduced, potentially resulting in decreased complexity and memory bandwidth requirements.

19 Claims, 18 Drawing Sheets

(51) Int. Cl.

| | |
|---|---|
| H04N 19/105 | (2014.01) |
| H04N 19/52 | (2014.01) |
| H04N 19/176 | (2014.01) |
| H04N 19/593 | (2014.01) |
| H04N 19/11 | (2014.01) |
| H04N 19/156 | (2014.01) |
| H04N 19/44 | (2014.01) |
| H04N 19/55 | (2014.01) |

(56) References Cited

U.S. PATENT DOCUMENTS

| | | |
|---|---|---|
| 2010/0021072 A1 | 1/2010 | Shimizu et al. |
| 2010/0034260 A1 | 2/2010 | Shimizu et al. |
| 2010/0111183 A1* | 5/2010 | Jeon ................ H04N 19/597 375/240.16 |
| 2012/0219064 A1 | 8/2012 | Zheng et al. |
| 2013/0229485 A1* | 9/2013 | Rusanovskyy ..... H04N 13/0048 348/43 |
| 2014/0086322 A1 | 3/2014 | Takahashi et al. |
| 2014/0168363 A1 | 6/2014 | Kang et al. |

FOREIGN PATENT DOCUMENTS

| | | |
|---|---|---|
| TW | I346485 | 8/2006 |
| TW | I327306 | 7/2010 |
| TW | 201034469 | 9/2010 |
| TW | 346509 | 8/2011 |
| TW | 348320 | 9/2011 |
| TW | 351883 | 11/2011 |
| TW | 201233192 | 8/2012 |
| WO | 2006111294 | 10/2006 |
| WO | 2007035054 A1 | 3/2007 |
| WO | 2009023091 A2 | 2/2009 |
| WO | 2012145670 A1 | 10/2012 |
| WO | 2012169403 | 12/2012 |
| WO | 2012171442 A1 | 12/2012 |
| WO | 2013053309 A1 | 4/2013 |

OTHER PUBLICATIONS

Bross, et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11, JCTVC-L1003_v34, 12th Meeting: Geneva, CH, Jan. 14-23, 2013, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen., et al., "3D-CE2.a related: MB-level depth-to-DV conversion in ATM," JCT3V-C0134, Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, 3 pp.
Guo, et al., "Multiview video coding based on global motion model", Advances in Multimedia Information Processing—PCM 2004, 5th Pacific Rim Conference on Multimedia, Tokyo, Japan, Nov. 30-Dec. 3, 2004; [Lecture Notes in Computer Science], Springer, Berlin, DE, vol. 3333, XP002559461, pp. 665-672.
International Preliminary Report on Patentability from International Application No. PCT/US2013/074981, dated Mar. 12, 2015, 20 pp.
International Search Report and Written Opinion from International Application No. PCT/US2013/074981, dated Mar. 27, 2014, 28 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jung et al., "CE2.h related: reduced candidates of NBDV", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-E0190-v4, XP030131227, 4 pp.
Kang, et al., "3D-CE5.h related: Improvements for disparity vector derivation", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-B0047, XP030130228, 4 pp.
Kang, et al., "CE2.h related: CU-based Disparity Vector Derivation in 3D-HEVC," Qualcomm Incorporated, JCT3V-D0181, Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013, 4 pp.
Kim, et al., "CU-based Merge Candidate List Construction," Document: JCTVC-G416, Joint Collaborative Team on Video Coding (JCT-VC) of ITU-T SG16 WP3 and ISO/IEC JTC1/SC29/WG11, 7th Meeting: Geneva, No. JCTVCG416, Nov. 8, 2011, XP030110400, 13 pp.
Koo, et al., "CE11: MVC motion skip mode", JVT Meeting; MPEG Meeting; Marrakech, MA; (Joint Video Team of ISO/IEC JTC1/SC29/WG11 and ITU-T SG.16), No. JVT-V069, Jan. 10, 2007, XP030006877, 12 pp.
Lin, et al., "CE5.h related: removal of dependency between multiple PUs in a CU for disparity vector derivation," Hisilicon Technologies Co., Ltd., JCT3V-B0096, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, 3 pp.
Park, et al., "3D-CE2.h related: Simplified NBDV and improved disparity vector derivation", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/JCT2/,, No. JCT3V-E0142, XP030131163, 5 pp.
Second Written Opinion from International Application No. PCT/US2013/074981, dated Nov. 3, 2014, 6 pp.
Sung J., et al., "3D-CE5.h Modified disparity vector derivation process for memory reduction", 102, MPEG Meeting; Oct. 15, 2012-Oct. 19, 2012; Shanghai; (Motion Picture Expert Group or ISO/IEC JTC1/SC29/WG11) No. m26980, Oct. 14, 2012, 5 pages, XP030055313, * section 1 *.
Sung, et al., "3D-CE5.h: Simplification of disparity vector derivation for HEVC-based 3D video coding", JCT-3V Meeting; 101. MPEG Meeting; Jul. 16-20, 2012; Stockholm; (The Joint Collaborative Team on 3D Video Coding Extension Development of ISO/IECJTC1/SC29/WG11 and ITU-T SG.16); URL: http://phenix.int-evry.fr/jct2/, No. JCT3V-A0126, 4 pp.
Tan, et al., "CE9: Skip/Merge Simplification with Reduced Candidate Set (Test L)", Mar. 10, 2011, No. JCTVC-E102, Mar. 10, 2011, XP030008608, 4 pp.
Tech, et al., "MV-HEVC Working Draft 1," Jul. 16-20, Document JCT3V-A1004_d0, 20 pp.
Tech, et al., "3D-HEVC Test Model 1" JCT-3V Meeting; MPEG Meeting; Jul. 16-20, 20121; Stockholm; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-A1005; XP030130183, 82 pp.

(56) References Cited

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Yu, et al.,"Parallel AMVP candidate list construction", JCT-VC Meeting; MPEG Meeting; Apr. 27-May 5, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-I0036, XP030111799, 7 pp.

Zhang, et al., "3D-CE5.h related: Disparity vector derivation for multiview video and 3DV", MPEG Meeting; Apr. 30-May 4, 2012; Geneva; (Motion Picture Expert Group or ISO/IEC JTC1/SC29/WG11),, No. m24937, XP030053280, 6 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Zhang, et al., "CE5.h: Disparity vector generation results," Jul. 16-20, 2012, Document: JCT2-A0097, 5 pp.

Tech, et al., "3D-HEVC Test Model 1," Document JCT3V-A1005__d0, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 83 pp.

* cited by examiner

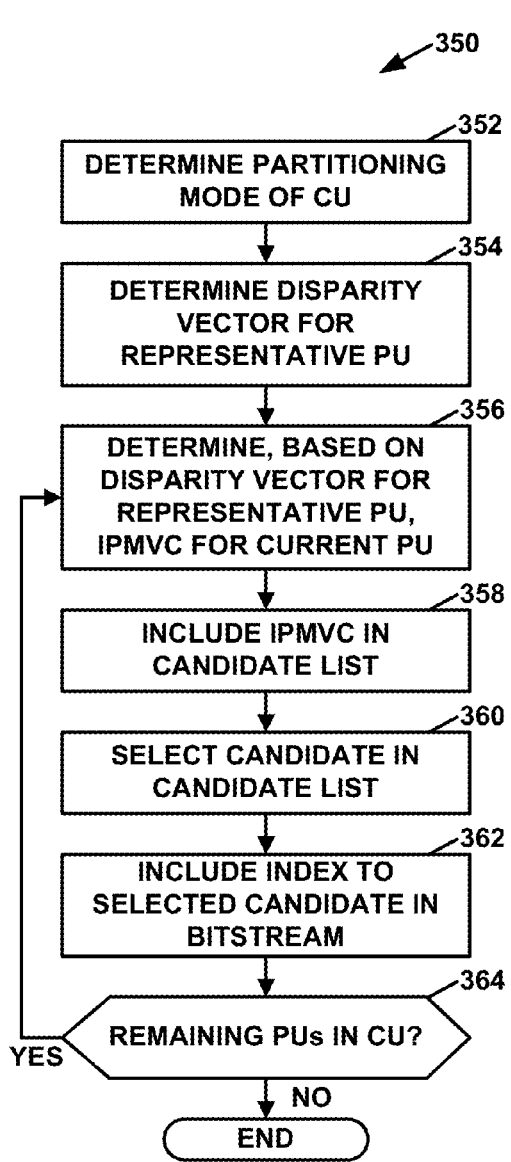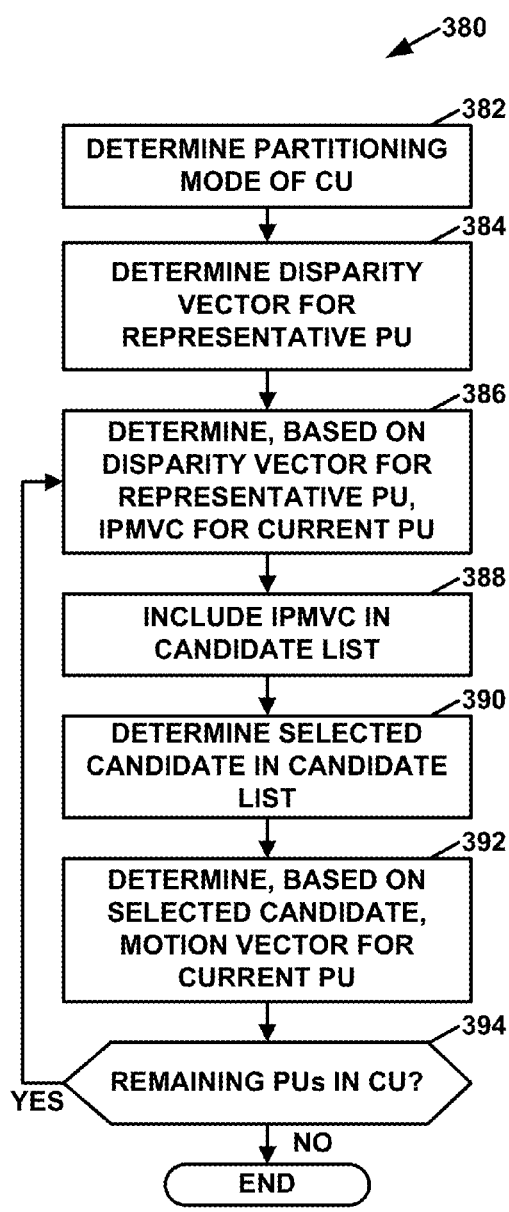
FIG. 11A
FIG. 11B

DISPARITY VECTOR DERIVATION

This application claims the benefit of U.S. Provisional Patent Application Ser No. 61/737,639, filed Dec. 14, 2012, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into blocks. Blocks in an intra-coded (I) slice of a picture are encoded using spatial prediction with respect to reference samples in neighboring blocks in the same picture. Blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards have been developed that make use of multi-view coding aspects. For example, different views may transmit left and right eye views to support 3D video. Alternatively, some 3D video coding processes may apply so-called multi-view plus depth coding. In multi-view plus depth coding, a 3D video bitstream may contain not only texture view components, but also depth view components. For example, each view may comprise one texture view component and one depth view component.

SUMMARY

In general, this disclosure relates to multi-view and 3-dimensional video coding. In particular, this disclosure describes a disparity vector derivation process to determine a disparity vector for a current block. As part of performing the disparity vector derivation process, when either a first or a second spatial neighboring block has a disparity motion vector or an implicit disparity vector, the disparity motion vector or the implicit disparity vector is converted to the disparity vector for the current block. In some examples, the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector. In this way, the number of neighboring blocks that is checked in the disparity vector derivation process may be reduced, potentially resulting in decreased complexity and memory bandwidth requirements.

In one example, this disclosure describes a method of decoding video data, the method comprising: performing a disparity vector derivation process to derive a disparity vector for a current block, wherein performing the disparity vector derivation process comprises: when either a first or a second spatial neighboring block has a disparity motion vector or an implicit disparity vector, converting the disparity motion vector or the implicit disparity vector to the disparity vector for the current block, wherein the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector; and reconstructing a sample block for the current block in part by performing, based on the derived disparity vector, inter-view prediction for the current block.

In another example, this disclosure describes a method of encoding video data, the method comprising: performing a disparity vector derivation process to derive a disparity vector for a current block, wherein performing the disparity vector derivation process comprises: when either a first or a second spatial neighboring block has a disparity motion vector or an implicit disparity vector, converting the disparity motion vector or the implicit disparity vector to the disparity vector for the current block, wherein the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector; and generating, based in part on the derived disparity vector for the current block, an encoded representation of the current block.

In another example, this disclosure describes a device comprising a memory configured to store video data; and one or more processors configured to perform a disparity vector derivation process to derive a disparity vector for a current block of the video data, wherein performing the disparity vector derivation process comprises: when either a first or a second spatial neighboring block has a disparity motion vector or an implicit disparity vector, converting the disparity motion vector or the implicit disparity vector to the disparity vector for the current block, wherein the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector.

In another example, this disclosure describes a device comprising: means for performing a disparity vector derivation process to derive a disparity vector for a current block, wherein performing the disparity vector derivation process comprises: when either a first or a second spatial neighboring block has a disparity motion vector or an implicit disparity vector, converting the disparity motion vector or the implicit disparity vector to the disparity vector for the current block, wherein the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector; and means for using the disparity vector for the current block to perform inter-view prediction.

In another example, this disclosure describes a non-transitory computer-readable data storage medium having instructions stored thereon that when executed cause one or more processors to: perform a disparity vector derivation process to derive a disparity vector for a current block, wherein performing the disparity vector derivation process comprises: when either a first or a second spatial neighboring block has a disparity motion vector or an implicit disparity vector, converting the disparity motion vector or the implicit disparity vector to the disparity vector for the current block, wherein the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector; and use the disparity vector for the current block to perform inter-view prediction.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 11A is a flowchart illustrating an example operation of a video encoder for performing inter-view motion prediction, in accordance with one or more techniques of this disclosure.

FIG. 11B is a flowchart illustrating an example operation of a video decoder for performing inter-view motion prediction, in accordance with one or more techniques of this disclosure.

DETAILED DESCRIPTION

Figure 1:
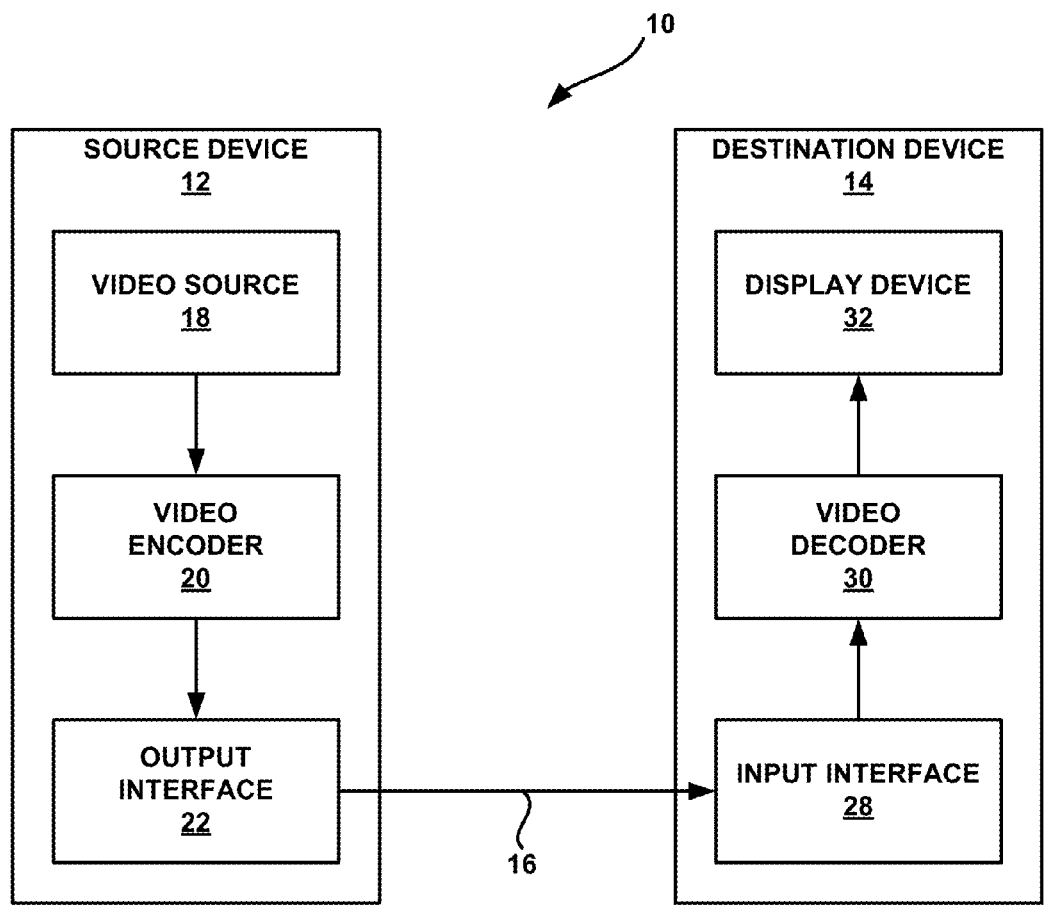
FIG. 1 is a block diagram illustrating an example video coding system that may utilize the techniques described in this disclosure.

High-Efficiency Video Coding (HEVC) is a newly-developed video coding standard. 3D-HEVC is an extension of HEVC for 3-dimensional (3D) video data. 3D-HEVC provides for multiple views of the same scene from different viewpoints. The standardization efforts for 3D-HEVC include the standardization of a multi-view video codec based on HEVC. In 3D-HEVC, inter-view prediction based on reconstructed view components (i.e., reconstructed pictures) from different views is enabled. Furthermore, 3D-HEVC implements inter-view motion prediction and inter-view residual prediction.

The pictures of each view that represent the same time instance of video include similar video content. However, the video content of views may be displaced spatially relative to one another. In particular, the video content of the views may represent different perspectives. For example, a video block in a picture in a first view may include video content that is similar to a video block in a picture in a second view. In this example, the location of the video block in the picture in the first view and the location of the video block in the picture in the second view may be different. For example, there may be some displacement between the locations of the video blocks in the different views.

A disparity vector for a video block provides a measure of this displacement. For example, a video block of a picture in a first view may be associated with a disparity vector that indicates the displacement of a corresponding video block in a picture in a second view.

One technique to derive a disparity vector for a video block is referred to as neighboring block disparity vector (NBDV) derivation. In NBDV derivation techniques, a video coder (e.g., a video encoder or a video decoder) evaluates blocks that neighbor the current block in order to determine whether any of the neighboring blocks have been inter-predicted with a picture in a different view. For instance, multi-view coding provides for inter-view prediction. In inter-view prediction, a video block in a picture in a first view is inter-predicted with data (e.g., a video block) in a picture in a second, different view. Inter-view prediction is similar to inter-prediction, wherein in both inter-prediction and inter-view prediction, a video block in a picture is inter-predicted with a video block in another picture. However, in regular inter-prediction, the pictures are from the same view, whereas, in inter-view prediction, the pictures are from different views.

There are several forms of inter-view prediction, including inter-view motion compensation, inter-view motion prediction, and inter-view residual prediction. In inter-view motion compensation, the video coder may determine a motion vector for the block that is being inter-view predicted. To avoid confusion, a motion vector that is used for inter-view prediction is referred to as a disparity motion vector because this motion vector refers to a picture in a different view. A motion vector for regular inter-prediction is referred to as a temporal motion vector because this motion vector refers to a picture in the same view, but at a different time instance.

A disparity motion vector identifies a block that is used for inter-view motion compensation of the current block. A disparity vector, on the other hand, identifies a block in a picture in a different view that includes similar video content as that of the current block. There may be various purposes of the disparity vector that are different than the purpose of the disparity motion vector. However, it may be possible that the disparity vector is used for the same purpose as the disparity motion vector, in which case the disparity vector and the disparity motion vector become the same. In general, however, the disparity vector and the disparity motion vector may be different vectors, and may be used for different purposes.

In NBDV derivation techniques, the video coder evaluates neighboring blocks of a current block and determines whether any of the neighboring blocks have been inter-view predicted with a disparity motion vector. If a neighboring block is inter-view predicted with a disparity motion vector, the video coder may convert the disparity motion vector for the neighboring block into the disparity vector for the current block. For instance, the video coder may convert the disparity motion vector for the neighboring block into the disparity vector for the current block by keeping the horizontal component of the disparity motion vector and setting the vertical component of the disparity motion vector to 0. In other examples, the video coder may set the vertical component to a value other than 0 when converting the disparity motion vector for the neighboring block to the disparity vector for the current block. The neighboring blocks may include blocks in the same picture as the current block (e.g., spatially neighboring blocks). Such spatially neighboring blocks may be inter-view predicted with a disparity motion vector, and the disparity motion vector for spatially neighboring blocks that may form the disparity vector for the current block is referred to as a spatial disparity vector (SDV). In some examples, the neighboring blocks may include blocks in a different picture than the picture in which the current block resides (e.g., temporally neighboring blocks). Such temporally neighboring blocks may be inter-view predicted with a disparity motion vector, and the disparity motion vector for temporally neighboring blocks that may form the disparity vector for the current block is referred to as a temporal disparity vector (TDV).

In some examples, the video coder may, as part of performing NBDV derivation, determine a disparity vector for the current block based on an implicit disparity vector (IDV) of a neighboring block. As indicated above, when the video coder performs NBDV derivation, the video coder checks neighboring blocks for disparity motion vectors. When the video coder checks a neighboring block for a disparity motion vector, the video coder may also determine whether the neighboring block has an IDV. If the neighboring block has an IDV, the video coder may set an IDV flag for the neighboring block to indicate that the neighboring block has an IDV. If, after checking each of the neighboring blocks for disparity motion vectors, the video coder determines that none of the neighboring blocks has a disparity motion vector, the video coder may use the IDV flags of the neighboring blocks to identify a neighboring block that has an IDV. The video coder may then convert the IDV into the disparity vector for the current block. The IDV for a neighboring block may be a disparity vector that was derived for the neighboring block during the prediction (i.e., coding) of the neighboring block.

From the above description for deriving a disparity vector for a current block, it can be seen that the derivation of the disparity vector for the current block may be computationally intensive and may require multiple calls to memory to determine the disparity motion vectors and IDVs for previously-coded neighboring blocks. In accordance with one or more techniques described in this disclosure, rather than deriving a disparity vector on a block-by-block basis, the video coder may derive a disparity vector for a group of blocks, and the video coder may use the derived disparity vector as the disparity vector for each of the blocks within the group of blocks.

For example, as described above, a coding unit (CU) may be partitioned into a plurality of prediction units (PUs). In accordance with one or more techniques described in this disclosure, rather than deriving a disparity vector for each PU within the CU, the video coder may derive a disparity vector for a representative PU of the CU. In this example, the video coder may assign the derived disparity vector (i.e., disparity vector for the representative PU) to each of the PUs within the CU, rather than separately deriving disparity vectors for each PU of the CU. Furthermore, the video coder may perform, based on the derived disparity vector and without separately deriving disparity vectors for any block in the plurality of blocks other than the representative block, inter-view prediction for two or more blocks in the plurality of blocks.

As described above, the video coder evaluates neighboring blocks to determine whether any of the neighboring blocks are inter-view predicted with a disparity motion vector. Some example techniques of this disclosure limit the number of neighboring blocks the video coder evaluates during NBDV derivation. For instance, when the video coder performs a disparity vector derivation process (e.g., NBDV derivation) and either a first or a second spatial neighboring block has a disparity motion vector or an IDV, the video coder may convert the disparity motion vector or the IDV to the disparity vector for the current block. However, the disparity vector derivation process does not determine whether any spatial neighboring blocks in addition to the first and second spatial neighboring blocks have disparity motion vectors or IDVs even if neither of the first or the second spatial neighboring blocks has a disparity motion vector or an IDV. Thus, regardless of whether the first and second spatial neighboring blocks have disparity motion vectors or IDVs, the video coder does not check any additional spatial neighboring blocks.

Furthermore, one or more techniques of this disclosure may modify the manner in which an IDV is handled. For instance, in some techniques, the video coder utilizes an IDV flag to indicate whether a neighboring block has an IDV. Storing the IDV flag may not be needed. Rather, in accordance with one or more techniques of this disclosure, a video coder may use out-of-bounds information (e.g., illegal values) to determine whether IDVs exist for previously-coded neighboring blocks. For instance, depending on whether a previously-coded neighboring block has such out-of-bounds information, the video coder may determine that an IDV is or is not present for the neighboring block.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data (e.g., video data, such as encoded and/or decoded video data) is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based 3DV extension. Furthermore, there is an ongoing effort to generate a three-dimensional video (3DV) coding extension to H.264/AVC, namely AVC-based 3DV. A joint draft of the MVC extension of H.264 is described in "Advanced video coding for generic audiovisual services," ITU-T Recommendation H.264, March 2010. In other examples, video encoder 20 and video decoder 30 may operate according to ITU-T H.261, ISO/IEC MPEG-1 Visual, ITU-T H.262 or ISO/IEC MPEG-2 Visual, and ITU-T H.263, ISO/IEC-4 Visual. Thus, video encoder 20 and video decoder 30 may operate according to video coding standards including ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its SVC and MVC extensions.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 8" or the "HEVC base specification," is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10$^{th}$ Meeting, Stockholm, Sweden, July 2012. Furthermore, there are ongoing efforts to produce scalable video coding, multi-view coding, and 3DV extensions for HEVC. The scalable video coding extension of HEVC may be referred to as SHEVC. Video encoder 20 and video decoder 30 may operate according to such extensions to the HEVC standard.

Currently, a Joint Collaboration Team on 3D Video Coding (JCT-3C) of VCEG and MPEG is developing a 3DV standard based on HEVC, for which part of the standardization efforts includes the standardization of the multi-view video codec based on HEVC (MV-HEVC) and another part for 3D video coding based on HEVC (3D-HEVC). For 3D-HEVC, new coding tools, including those in the coding unit/prediction unit level, for both texture and depth views may be included and supported. As of Dec. 5, 2013, software for 3D-HEVC (i.e., 3D-HTM version 6.0) can be downloaded from the following link:
[3D-HTM]:https://hevc.hhi.fraunhofer.de/svn/svn_3DVCSoftware/tags/HTM-6.06/

In general, the motion compensation loop of HEVC is the same as that in H.264/AVC. For example, the reconstruction of a current frame $\hat{I}$ may equal de-quantized coefficients r plus temporal prediction P:

$$\hat{I} = r + P.$$

In the formula above, P indicates uni-directional prediction for P frames or bi-directional prediction for B frames.

However, the unit of motion compensation in HEVC is different from that in previous video coding standards. For example, the concept of a macroblock in previous video coding standards does not exist in HEVC. Rather, macroblocks are replaced by a highly flexible hierarchical structure based on a generic quadtree scheme. Within this scheme, three types of blocks, i.e., coding units (CUs), prediction units (PUs), and transform units (TUs), are defined. A CU is a basic unit of region splitting. The concept of a CU is analogous to the concept of macroblock, but a CU is not restricted to a maximum size and a CU allows recursive splitting into four equally-sized CUs to improve the content adaptivity. A PU is a basic unit of inter/intra prediction and a PU may contain multiple arbitrarily-shaped partitions in a single PU to effectively code irregular image patterns. A TU is a basic unit of transform. TUs of a CU can be defined independently from PUs of the CU. However, a size of a TU is limited to the CU to which the TU belongs. This separation of the block structure into three different concepts may allow each to be optimized according to its role, which may result in improved coding efficiency.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs).

Each of the CTUs may comprise a coding tree block (CTB) of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs.

A slice may include an integer number of CTUs ordered consecutively in a raster scan order. A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks of macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU. Hence, in this disclosure, a CU may be said to be partitioned into one or more PUs. For ease of explanation, this disclosure may refer to the size of a prediction block of a PU as simply the size of the PU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on samples of the picture associated with the PU. In this disclosure, the phrase "based on" may indicate "based at least in part on."

If video encoder 20 uses inter prediction to generate the predictive blocks of a PU, video encoder 20 may generate the predictive blocks of the PU based on decoded samples of one or more pictures other than the picture associated with the PU. When inter prediction is used to generate the predictive blocks of a block (e.g., a PU), this disclosure may refer to the block as "inter-coded" or "inter predicted." Inter prediction may be uni-directional (i.e., uni-prediction) or bi-directional (i.e., bi-prediction). To perform uni-prediction or bi-prediction, video encoder 20 may generate a first reference picture list (RefPicList0) and a second reference picture list (RefPicList1) for a current picture. Each of the reference picture lists may include one or more reference pictures. After a reference picture list is constructed (namely RefPicList0 and RefPicList1 if available), a reference index to a reference picture list can be used to identify any reference picture included in the reference picture list.

When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. The motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may generate, based at least in part on samples corresponding to the first and second reference locations, the predictive blocks for the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location.

If video encoder 20 uses inter prediction to generate the predictive blocks of a PU, video encoder 20 may generate the predictive blocks of the PU based on samples of one or more pictures other than the picture associated with the PU. For instance, video encoder 20 may perform uni-directional inter prediction (i.e., uni-prediction) or bi-directional inter prediction (i.e., bi-prediction) on a PU.

In instances where video encoder 20 performs uni-prediction on a PU, video encoder 20 may determine, based on a motion vector of the PU, a reference location in a reference picture. Video encoder 20 may then determine a predictive block for the PU. Each sample in the predictive block for the PU may be associated with the reference location. In some examples, a sample in a predictive block for a PU may be associated with a reference location when the sample is within a block of samples having the same size as the PU and whose top-left corner is the reference location. Each sample in the predictive block may be an actual or interpolated sample of the reference picture. In instances where luma samples of the predictive block are based on interpolated luma samples of the reference picture, video encoder 20 may generate the interpolated luma samples by applying an 8-tap interpolation filter to actual luma samples of the reference picture. In instances where chroma samples of the predictive block are based on interpolated chroma samples of the reference picture, video encoder 20 may generate the interpolated chroma samples by applying a 4-tap interpolation filter to actual chroma samples of the reference picture. In general, the number of taps of a filter indicates the number of coefficients request to represent the filter mathematically. A filter with a higher tap number is generally more complex than a filter having a lower tap number.

In instances where video encoder 20 performs bi-prediction on a PU, the PU has two motion vectors. Video encoder 20 may determine, based on the motion vectors of the PU, two reference locations in two reference pictures. Video encoder 20 may then determine, in the manner described above, reference blocks associated with the two reference locations. Video encoder 20 may then determine a prediction block for the PU. Each sample in the prediction block may be a weighted average of corresponding samples in the reference blocks. The weighting of the samples may be based on temporal distances of the reference pictures from the picture containing the PU.

Video encoder 20 may partition a CU into one or more PUs according various partitioning modes. For instance, if intra prediction is used to generate predictive blocks for the PUs of a CU, the CU may be partitioned according to a PART_2N×2N mode or a PART_N×N mode. In the PART_2N×2N mode, the CU only has one PU. In the PART_N×N mode, the CU has four equally-sized PUs having rectangular prediction blocks. If inter prediction is used to generate predictive blocks for the PUs of a CU, the CU may be partitioned according to the PART_2N×2N mode, the PART_N×N mode, a PART_2N×N mode, a PART_N×2N mode, a PART_2N×nU mode, a PART_2N×nD mode, a PART_nL×2N mode, or a PART_nR×2N mode. In the PART_2N×N mode and the PART_N×2N mode, the CU is partitioned into two equally-sized PUs having rectangular prediction blocks. In each of the PART_2N×nU mode, the PART_2N×nD mode, the PART_nL×2N mode, and the PART_nR×2N mode, the CU is partitioned into two unequally-sized PUs having rectangular prediction blocks.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A TU of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. Video encoder 20 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. In some examples, the QP value associated with the CU may be associated with the current picture or slice as a whole. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, SEI, and so on. NAL units that encapsulate RBSPs for video coding data (as opposed to RBSPs for parameter sets and SEI messages) may be referred to as video coding layer (VCL) NAL units.

In HEVC, SPSs may contain information that applies to all slices of a coded video sequence (CVS). In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A VPS is a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Each coded picture has a reference picture set that includes all the pictures that may be used for reference by either the coded picture or the picture following (future) the coded picture. A video coder may distinguish which pictures can only be used as a reference of a future picture. Reference picture lists are constructed based on the pictures in the reference picture set ("RPS") that can be used for the current picture (namely "RPS for current") thus not the pictures that can only be used as references of future pictures.

In some examples, when video encoder 20 begins encoding a current picture, video encoder 20 may generate five subsets of reference pictures (i.e., reference picture subsets) for the current picture. In some examples, these five reference picture subsets are: RefPicSetStCurrBefore, RefPicSetStCurrAfter, RefPicSetStFoll, RefPicSetLtCurr, and RefPicSetLtFoll. This disclosure may refer to the reference pictures in RefPicSetStCurrBefore, RefPicSetStCurrAfter, RefPicSetStFoll as "short-term reference pictures," "short-term pictures," or "STRPs." Thus, a "short-term reference picture" may be a picture that is marked (e.g., by virtue of being in RefPicSetStCurrBefore, RefPicSetStCurrAfter, or RefPicSetStFoll) as being used for short-term reference. This disclosure may refer to the reference pictures in RefPicSetLtCurr and RefPicSetLtFoll as "long-term reference pictures," "long-term pictures," or "LTRPs." The video encoder may re-generate the five reference picture subsets for each picture.

Furthermore, when a current slice of the current picture is a P slice (i.e., a slice in which intra prediction and uni-directional inter prediction are enabled), video encoder 20 may use the reference pictures from the RefPicStCurrAfter, RefPicStCurrBefore, and RefPicStLtCurr reference picture subsets of the current picture to generate a single reference picture list (RefPicList0) for the current slice. When the current slice is a B slice (i.e., a slice in which intra prediction, uni-directional inter prediction, and bi-directional inter prediction are enabled), video encoder 20 may use the reference pictures from the RefPicStCurrAfter, RefPicStCurrBefore, and RefPicStLtCurr reference picture subsets of the current picture to generate two reference picture lists (RefPicList0 and RefPicList1) for the current slice. Video encoder 20 may include, in a slice header for a first slice of the current picture, syntax elements that video decoder 30 may use to determine the reference picture subsets of the current picture. When video decoder 30 decodes a current slice of the current picture, video decoder 30 may determine the reference picture subsets of the current picture and may regenerate RefPicList0 and/or RefPicList1.

As indicated above, when a video coder (e.g., video encoder 20 or video decoder 30) begins coding a current slice of a picture, the video coder may initialize a first reference picture list (i.e., RefPicList0). Furthermore, if the current slice is a B slice, the video coder may initialize a second reference picture list (i.e., RefPicList1). In some examples, reference picture list initialization is an explicit mechanism that puts reference pictures in a reference picture memory (i.e., a decoded picture buffer) into a list based on the order of picture order count (POC) values of the reference pictures. A POC value is a variable that is associated with each picture that indicates the position of the associated picture in output order relative to the output order positions of the other pictures in the same coded video sequence.

To generate RefPicList0, a video coder (e.g., a video encoder or a video decoder) may generate an initial, default version of RefPicList0. In the initial version of RefPicList0, reference pictures in RefPicSetStCurrBefore are listed first, followed by reference pictures in RefPicSetStCurrAfter, followed by reference pictures in RefPicSetLtCurr. Similarly, to generate RefPicList1, the video coder may generate an initial version of RefPicList1. In the initial version of RefPicList1, reference pictures in RefPicSetStCurrAfter are listed first, followed by reference pictures in RefPictSetStCurrBefore, followed by reference pictures in RefPicSetLtCurr.

After a video coder has initialized a reference picture list (e.g., RefPicList0 or RefPicList1), the video coder may modify the order of the reference pictures in the reference picture list. In other words, the video coder may perform a reference picture list modification (RPLM) process. The video coder may modify the order of the reference pictures in any order, including the case where one particular reference picture may appear at more than one position in the reference picture list. In other words, the reference picture list reordering mechanism can modify the position of a picture that was put in the list during the reference picture list initialization to any new position, or put any reference picture in the reference picture memory in any position, even if the picture does not belong in the initialized list. However, if a position of a picture exceeds the number of active reference pictures of the list, the picture is not considered as an entry of the final reference picture list. A slice header may include one or more syntax elements that indicate the number of active reference pictures in the reference picture lists.

In some examples, the video coder constructs a combined list (e.g., RefPicListC) for a B slice after the video coder has constructed the final reference picture lists (i.e., RefPicList0 and RefPicList1). The video coder may further modify the combined list further if one or more reference picture list modification syntax elements are present for the combined list.

In some examples, video encoder 20 may signal the motion information of a PU using merge/skip mode or advanced motion vector prediction (AMVP) mode. In other words, in HEVC, there are two modes for the prediction of motion parameters, one being the merge/skip mode and the other being AMVP mode. Motion prediction may comprise the determination of motion information of a block (e.g., a PU) based on motion information of one or more other blocks. The motion information of a PU may include motion vector(s) of the PU, reference index(es) of the PU, and one or more prediction direction indicators.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index (i.e., a merging candidate index) that indicates a position within the candidate list of the selected merge candidate. Video decoder 30 may obtain, from the bitstream, the index into the candidate list (i.e., the merging candidate index). In addition, video decoder 30 may generate the same merge candidate list and may determine, based on the merging candidate index, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a prediction block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX (where X is 0 or 1) motion information of a current PU using AMVP mode, video encoder 20 may signal a RefPicListX motion vector difference (MVD) for the current PU and a RefPicListX reference index for the current PU in addition to signaling a RefPicListX motion vector predictor (MVP) flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP flag, a RefPicListX reference index value, and a RefPicListX MVD. In other words, the data in the bitstream representing the motion vector for the current PU may include data representing a reference index, an index to a candidate list, and an MVD. Thus, the chosen motion vectors may be signaled by transmitting an index into the candidate list. In addition, the reference index values and motion vector differences may also be signaled.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. In other words, in AMVP, a candidate list of motion vector predictors for each motion hypothesis is derived based on the coded reference index. As before, this list may include motion vectors of neighboring blocks that are associated with the same reference index as well as a temporal motion vector predictor which is derived based on the motion parameters of the neighboring block of the co-located block in a temporal reference picture. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When a video coder generates an AMVP candidate list for a current PU, the video coder may derive one or more AMVP candidates based on the motion information of PUs (i.e., spatially-neighboring PUs) that cover locations that spatially neighbor the current PU and one or more AMVP candidates based on motion information of PUs that temporally neighbor the current PU. In this disclosure, a PU (or other type of video unit) may be said to "cover" a location if a prediction block associated with the PU (or other type of sample block associated with the video unit) includes the location. The candidate list may include motion vectors of neighboring blocks that are associated with the same reference index as well as a temporal motion vector predictor which is derived based on the motion parameters (i.e., motion information) of the neighboring block of the co-located block in a temporal reference picture.

Figure 2:
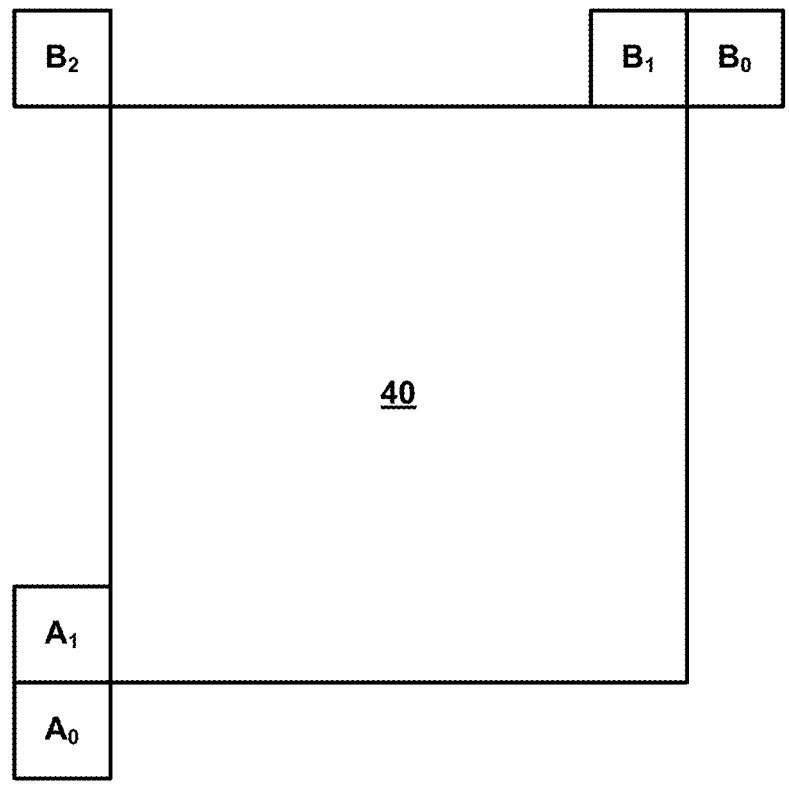
FIG. 2 is a conceptual diagram illustrating example spatially-neighboring prediction units (PUs) relative to a current PU.

FIG. 2 is a conceptual diagram illustrating example spatially-neighboring PUs relative to a current PU 40. In the example of FIG. 2, the spatially-neighboring PUs may be PUs that cover the locations indicated as $A_0$, $A_1$, $B_0$, $B_1$, and $B_2$. In other words, an example relationship between current PU 40 and its spatial neighboring PUs is depicted in FIG. 2.

With regard to the spatial neighbor PUs, the following symbols may be defined:
A luma location (xP, yP) is used to specify the top-left luma sample of the current PU relative to the top-left sample of the current picture;
Variables nPSW and nPSH denote the width and the height of the PU for luma;
The top-left luma sample of the current PU N relative to the top-left sample of the current picture is (xN, yN).
In the definitions above, (xN, yN) (with N being replaced by $A_0$, $A_1$, $B_0$, $B_1$ or $B_2$) is defined as (xP−1, yP+nPSH), (xP−1, yP+nPSH−1), (xP+nPSW, yP−1), (xP+nPSW−1, yP−1) or (xP−1, yP−1), respectively.

A candidate in a merge candidate list or an AMVP candidate list that is based on the motion information of a PU that temporally neighbors a current PU (i.e., a PU that is associated with a different time instance than the current PU) may be referred to as a TMVP. A TMVP may be used to improve the coding efficiency of HEVC and, different from other coding tools, a TMVP may need to access a motion vector of a frame in a decoded picture buffer. More specifically, a TMVP may need to access a motion vector of a picture in a reference picture list.

To determine a TMVP, a video coder may firstly identify a reference picture that includes a PU that is co-located with the current PU. In other words, the video coder may identify a so-called "co-located picture." If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. In other words, when the use of TMVPs is enabled for a current slice, and the current slice is a B slice (e.g., a slice that is allowed to include bi-directionally inter predicted PUs), video encoder 20 may signal a syntax element (e.g., collocated_from_l0_flag) in a slice header to indicate whether the co-located picture is in RefPicList0 or RefPicList1.

A syntax element (e.g., collocated_ref_idx) in a slice header may indicate a co-located picture in the identified reference picture list. Thus, after video decoder 30 identifies the reference picture list that includes the co-located picture, video decoder 30 may use collocated_ref_idx, which may be signaled in a slice header, to identify the co-located picture in the identified reference picture list.

The video coder may identify a co-located PU by checking the co-located picture. The TMVP may indicate either the motion information of a right-bottom PU of the CU containing the co-located PU, or the motion information of the right-bottom PU within the center PUs of the CU containing this PU. Thus, either the motion of the right-bottom PU of the CU containing this PU, or the motion of the right-bottom PU within the center PUs of the CU containing this PU is used. The right-bottom PU of the CU containing the co-located PU may be a PU that covers a location co-located with a location immediately below and right of a bottom-right sample of a prediction block of the PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU (i.e., a center of a prediction block of the current PU).

When the video coder generates a motion vector candidate (e.g., a candidate in a merge list of an AMVP candidate list) that specifies a motion vector of a TMVP in a temporal reference picture, the video coder may scale the motion vector of the TMVP based on the temporal location (reflected by POC value) of the temporal reference picture. In other words, the video coder may scale a motion vector of the motion vector candidate based on a POC distance between the current picture and the reference picture. For instance, when a video coder scales a motion vector based on a POC distance between a first picture and a second picture, the video coder may increase the magnitude of the motion vector by greater amounts when a difference between the POC values of the first picture and the second picture is greater than when a difference between the POC values of the first picture and the second picture is less.

In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In other words, in multi-view coding, inter-view prediction is performed among pictures captured in the different views of the same access unit (i.e., within the same time instance) to remove correlation between views. In contrast, conventional inter prediction only uses pictures in different access units as reference pictures.

In multi-view coding, a bitstream may have a plurality of layers. The layers may correspond to different views. A view may be referred to as a "base view" if a video decoder (e.g., video decoder 30) can decode pictures associated with the view without reference to pictures in any other view. A view may be referred to as a non-base view if decoding of the view is dependent on decoding of pictures associated with one or more other views.

For instance, NAL units may include headers (i.e., NAL unit headers) and payloads (e.g., RBSPs). The NAL unit headers may include nuh_reserved_zero_6bits syntax elements. NAL units that have nuh_reserved_zero_6bit syntax elements that specify different values belong to different "layers" of a bitstream. Thus, in multi-view coding, 3DV, or SVC, the nuh_reserved_zero_6bits syntax element of a NAL unit may specify a layer identifier (i.e., a layer ID) of the NAL unit. In some examples, the nuh_reserved_zero_6bits syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_reserved_zero_6bits syntax element may have a non-zero value. As indicated above, in multi-view coding and 3DV coding, different layers of a bitstream may correspond to different views. In SVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

NAL units may also include temporal_id syntax elements. The temporal_id syntax element of a NAL unit specifies a temporal identifier of the NAL unit. The temporal identifier of a NAL unit identifies a sub-layer with which the NAL unit is associated. Thus, each sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

When coding a picture in one of the non-base views, a video coder (such as video encoder 20 or video decoder 30) may add a picture into a reference picture list if the picture is associated with a different view than the picture that the video coder is current coding but is associated with a same time instance (i.e., access unit) as the picture that the video coder is currently coding. Like other inter prediction reference pictures, the video coder may insert an inter-view prediction reference picture at any position of a reference picture list in the same way as with an inter prediction reference picture. In other words, a picture coded with inter-view prediction may be added into a reference picture list for the inter-view prediction of the other non-base views.

In the MVC extension of H.264/AVC, inter-view prediction is supported by disparity motion compensation (i.e., inter-view motion prediction), which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multi-view representation. Consequently, any renderer with a MVC decoder may expect 3D video contents with more than two views.

In MVC, inter-view prediction is allowed among pictures in the same access unit (i.e., with the same time instance). When coding a picture in a non-base view, a video coder may include, in a reference picture list, an inter-view reference picture (i.e., a picture that is associated with a different view than the current picture but is associated with the same time instance as the current picture). An inter-view reference picture can be put in any position of a reference picture list, just like any inter prediction reference picture. When an inter-view reference picture is used for motion compensation, the corresponding motion vector is referred to as a "Disparity Motion Vector."

In the context of multi-view video coding, there are two kinds of motion vectors. One kind of motion vector is a normal motion vector that points to a temporal reference picture. The type of inter prediction corresponding to a normal, temporal motion vector may be referred to as motion-compensated prediction (MCP). When an inter-view prediction reference picture is used for motion compensation, the corresponding motion vector may be referred to as a "disparity motion vector." In other words, a disparity motion vector points to a picture in a different view (i.e., a disparity reference picture or an inter-view reference picture). The type of inter prediction corresponding to a disparity motion vector may be referred to as "disparity-compensated prediction" or "DCP."

Figure 3:
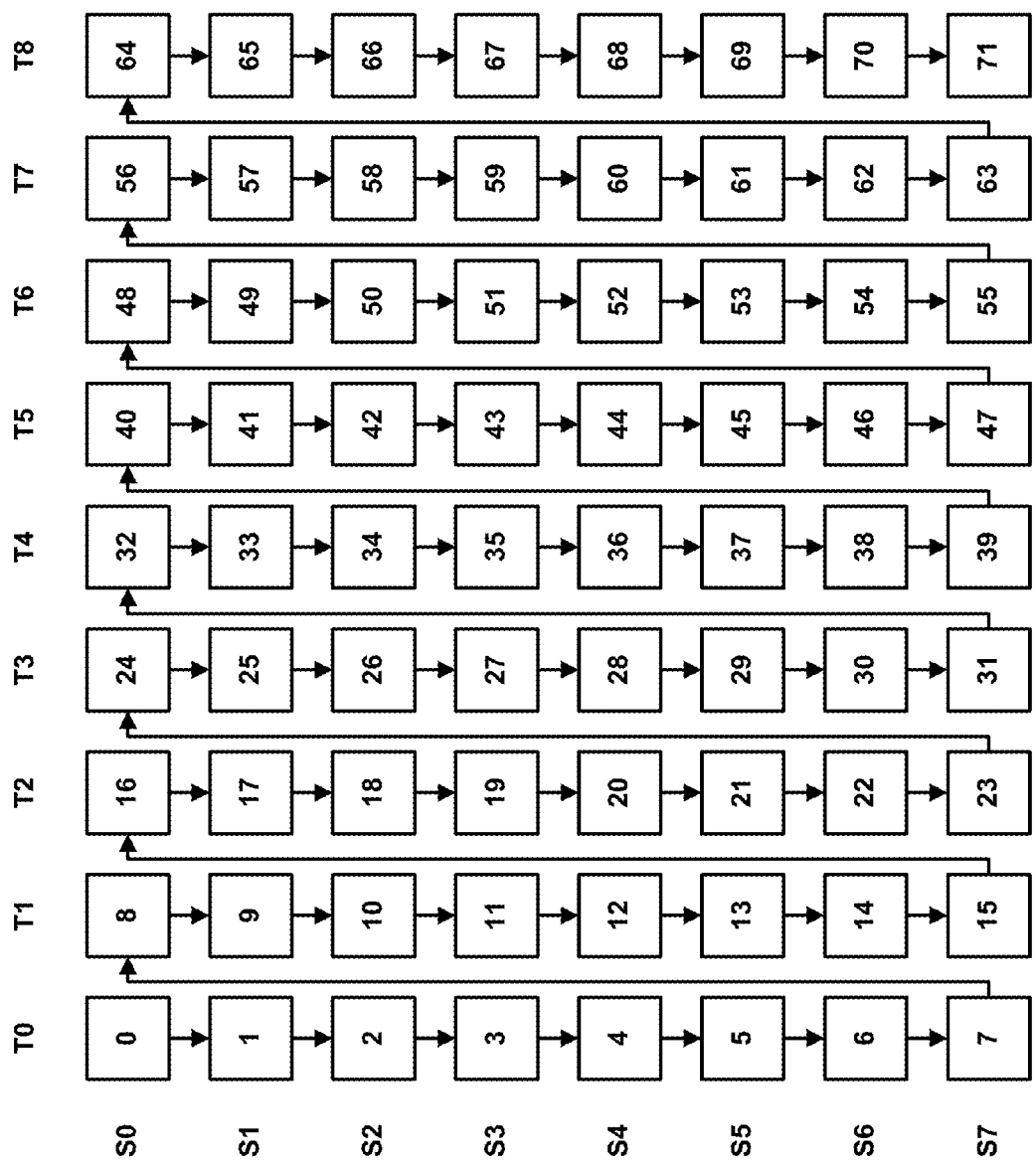
FIG. 3 is a conceptual diagram illustrating an example multi-view decoding order.

FIG. 3 is a conceptual diagram illustrating an example multi-view decoding order. The multi-view decoding order may be a bitstream order. In the example of FIG. 3, each square corresponds to a view component. Columns of squares correspond to access units. Each access unit may be defined to contain the coded pictures of all the views of a time instance. Rows of squares correspond to views. In the example of FIG. 3, the access units are labeled T0 . . . T8 and the views are labeled S0 . . . S7. Because each view component of an access unit is decoded before any view component of the next access unit, the decoding order of FIG. 3 may be referred to as time-first coding. The decoding order of access units may not be identical to the output or display order.

Multi-view coding may support inter-view prediction. Inter-view prediction is similar to the inter prediction used in H.264/AVC, HEVC, or other video coding specifications and may use the same syntax elements. However, when a video coder performs inter-view prediction on a current video unit (such as a macroblock or PU), the video coder may use, as a reference picture, a picture that is in the same access unit as the current video unit, but in a different view. In contrast, conventional inter prediction only uses pictures in different access units as reference pictures.

Figure 4:
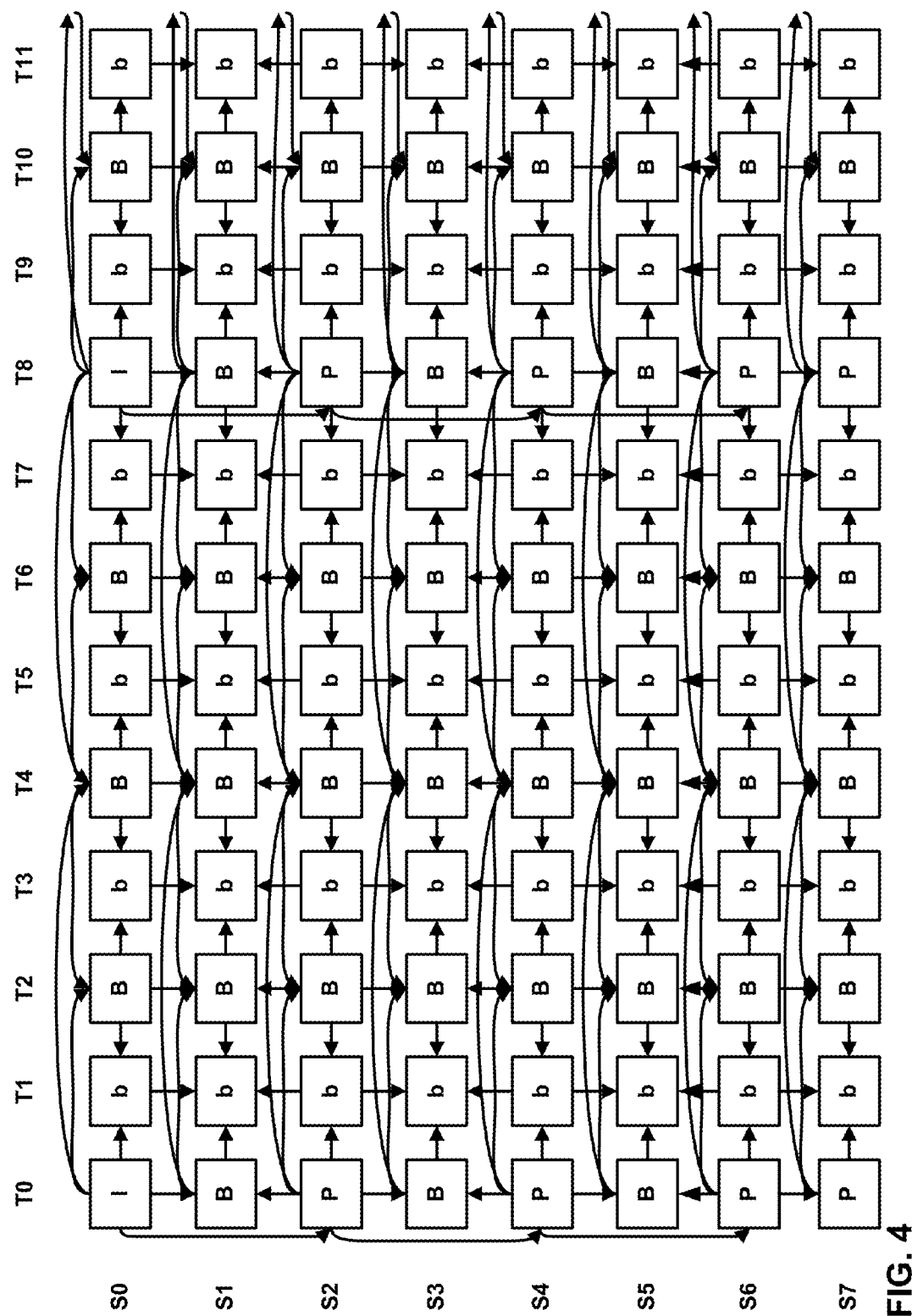
FIG. 4 is a conceptual diagram illustrating an example prediction structure for multi-view coding.

FIG. 4 is a conceptual diagram illustrating an example prediction structure for multi-view coding. The multi-view prediction structure of FIG. 4 includes temporal and inter-view prediction. In the example of FIG. 4, each square corresponds to a view component. In the example of FIG. 4, the access units are labeled T0 . . . T11 and the views are labeled S0 . . . S. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 4, view components in different views of the same access unit may be available as reference pictures. Thus, FIG. 4 shows a typical MVC prediction (including both inter-picture prediction within each view and inter-view prediction) structure for multi-view video coding, where predictions are indicated by arrows, the pointed-to object using the point-from object for prediction reference. The use of one view component of an access unit as a reference picture for another view component of the same access unit may be referred to as inter-view prediction.

As mentioned above, a multi-view extension of HEVC (i.e., MV-HEVC) and a 3DV extension of HEVC (i.e., 3D-HEVC) are under development. That is, a Joint Collaboration Team on 3D Video Coding (JCT-3V) of VCEG and MPEG is developing a 3DV standard based on HEVC, for which part of the standardization efforts includes the standardization of the multi-view video codec based on HEVC (MV-HEVC) and another part for 3D Video coding based on HEVC (3D-HEVC).

Gerhard Tech et al., "3D-HEVC Test Model Description draft 1," JCT3V-A1005, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 (hereinafter, "3D-HEVC Test Model 1"), provides a reference software description, as well as the working draft, of 3D-HEVC. Reference software for 3D-HEVC, namely 3DV-HTM, is available from https://hevc.hhi.fraunhofer.de/svn/svn_3DVCSoftware/trunk. Gerhard Tech et al., "MV-HEVC Working Draft 1," JCT3V-A1004, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 (hereinafter, "JCT3V-A1004"), provides a working draft for MV-HEVC.

The random access concept of HEVC is extended to the multi-view and 3DV extensions. JCT3V-A1004 includes detailed definitions of the random access point access units as well as the random access view components. For instance, JCT3V-A1004 defines a random access point (RAP) view component as a view component containing only slices and for which each slice has nal_unit_type in the range of 7 to 12, inclusive. A random access point view component is not predicted from inter prediction. Thus, in the multi-view or 3D extension of HEVC (i.e., MV-HEVC or 3D-HEVC), whether a view component is a random access point or not depends on the NAL unit type of the view component. If the type belongs to those defined in the HEVC base specification for random access point pictures, the current view component is a random access point view component (or for simplicity, random access point picture of the current view). A random access point (RAP) view component may be a P or B picture. A P picture is a picture in which uni-predictive inter prediction and intra prediction are allowed, but bi-predictive inter prediction is not allowed. A B picture is a picture in which uni-predictive inter prediction, bi-predictive inter prediction, and intra prediction are allowed. Furthermore, JCT3V-A1004 defines a random access point access unit as an access unit in which the coded picture is a RAP picture.

In some examples, random access functionality only applies to temporal prediction in a way that certain predictions in the temporal dimension (thus inside a view) is either disabled or constrained similarly as in the HEVC base specification. However, inter-view prediction for a random access point view component may still be possible, and typical, to improve the coding efficiency, similar to the anchor picture in H.264/MVC.

A video coder may determine disparity vectors for blocks (e.g., PUs, CUs, etc.). In general, a disparity vector is used as an estimator of the displacement between two views. A video coder may use a disparity vector for a block either to locate a reference block in another view for inter-view motion or residual prediction, or the video coder may convert the disparity vector to a disparity motion vector for inter-view motion prediction.

When a video coder performs inter-view motion prediction for a current block (e.g., a current PU, CU, etc.), the video coder may use a disparity vector for the current block to identify a corresponding block (e.g., a reference PU) in a reference view. The video coder may then use the motion information (e.g., a motion vector, reference index, etc.) of the corresponding block as a candidate in a candidate list for merge mode or AMVP mode. In other words, a corresponding block of the current block is identified by a disparity vector, and its motion vectors may be used as an additional candidate of the AMVP or merge list of the current block. Furthermore, in some examples, the video coder may use the disparity vector for the current block as a candidate in a candidate list for merge mode or AMVP mode. That is, the disparity vector may be converted to a disparity motion vector and added into an AMVP or merge list.

Furthermore, a video coder may use a disparity vector of a block (e.g., a PU, a CU, etc.) to perform inter-view residual prediction. When video encoder 20 performs inter-view residual prediction, video encoder 20 may use a disparity vector for a current block to identify a corresponding block in a reference view. Video encoder 20 may then determine the residual for the corresponding block. Video encoder 20 may then signal the difference between the residual for the corresponding block and the residual for the current block. Video decoder 30 may use the disparity vector for the current block to identify the corresponding block and may determine the residual for the corresponding block. The video coder may then add samples of the signaled residual to corresponding samples of the residual for the corresponding block and corresponding samples of a predictive block for the current block to reconstruct samples of the current block. In this way, if the current block is a current CU and if the corresponding block of the current CU contains non-zero residual pixels, the residue of the blocks are used to predict the residue of the current CU.

In some examples, the video coder may use the method of Neighboring Blocks Based Disparity Vector (NBDV) to derive a disparity vector for a block. 3D-HEVC first adopted the NBDV derivation process proposed in L. Zhang et al., "3D-CE5.h: Disparity vector generation results," Joint Collaborative Team on 3D Video Coding Extension Development of ITU-T SG 16 WP 3 and ISO/IEC JTC 1/SC 29/WG 11, 1$^{st}$ Meeting: Stockholm, SE, 16-20 Jul. 2012, document JCT3V-A0097 (hereinafter, "JCT3V-A0097"). The NBDV derivation process has since been further adapted. For instance, implicit disparity vectors (IDVs) were included with a simplified NBDV in Sung et al., "3D-CE5.h: Simplification of disparity vector derivation for HEVC-based 3D video coding," Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, document JCT3V-A0126 (hereinafter, "JCT3V-A0126"). Furthermore, in Kang et al., "3D-CE5.h related: Improvements for disparity vector derivation," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0047 (hereinafter, "JCT3V-B0047"), the NBDV derivation process is further simplified by removing the IDVs stored in the decoded picture buffer, while providing an improved a coding gain with the RAP picture selection.

Disparity motion compensation in multi-view video coding is performed with disparity motion vectors. Because neighboring blocks (e.g., blocks that spatially or temporally neighbor the current block) share almost the same motion/disparity information in video coding, the current block can use the motion vector information in neighboring blocks as a good predictor to improve coding gain. Following this idea, the NBDV derivation process uses the neighboring disparity information for estimating the disparity vector in different views. Specifically, the NBDV derivation process uses disparity motion vectors from spatial and temporal neighboring blocks to derive the disparity vector for the current block.

When a video coder performs the NBDV derivation process, the video coder may utilize two sets of neighboring blocks. One set is from spatially-neighboring blocks and the other set is from temporally-neighboring blocks. The video coder may check the spatial neighboring blocks and temporal neighboring blocks in a pre-defined order. The pre-defined order may be determined by the priority of the correlation between the current block and the candidate block. Once a disparity motion vector is found in the candidates, the video coder may convert the disparity motion vector to a disparity vector.

In some versions of the NBDV derivation process, the video coder uses five spatial neighboring blocks for disparity vector derivation. For instance, the video coder may check the following spatially-neighboring blocks: the below-left spatially-neighboring block, the left spatially-neighboring block, the above-right spatially-neighboring block, the above spatially-neighboring block, and the above-left spatially-neighboring block of the current block. Furthermore, in some versions of the NBDV derivation process, the five spatially-neighboring blocks are used for disparity vector derivation blocks may cover the locations $A_0$, $A_1$, $B_0$, $B_1$, and $B_2$, respectively, as indicated in FIG. 2. In some examples, the spatially-neighboring blocks used in the NBDV derivation process are the same as those used in the merge modes in HEVC. Therefore, in some such examples, no additional memory access is required.

Furthermore, as mentioned above, a video coder may check temporally-neighboring PUs as part of the process of determining a disparity vector for a current block (e.g., a current PU). When the video coder checks temporal neighboring blocks (e.g., temporal neighboring PUs), the video coder may first perform a construction process of a candidate picture list. When the video coder performs the construction process of the candidate picture list, the video coder may treat all reference pictures from the current view (i.e., the view associated with the current block) as candidate pictures. Furthermore, when the video coder performs the construction process of the candidate picture list, the video coder may first insert a so-called "co-located picture" into the candidate picture list, followed by the rest of the candidate pictures in ascending order of reference index. That is, the video coder may insert the remaining candidate pictures into the candidate picture list in accordance with the order that the remaining candidate pictures occur in reference picture lists (e.g., RefPicList0 and RefPicList1) of the current picture. One or more syntax elements in a slice header of a slice containing the current block may indicate the co-located picture. When the reference pictures with the same reference index in both reference picture lists (e.g., RefPicList0 and RefPicList1) are available for use in the NDBV derivation process, the reference picture in the same reference picture list as the co-located picture precedes, in the candidate picture list, the other reference picture.

After generating the candidate picture list, the video coder may determine candidate regions within the candidate pictures in the candidate picture list. The video coder may use the candidate regions to determine temporally-neighboring blocks. As indicated above, the video coder may derive a disparity vector for the current block based on a disparity motion vector or an IDV of a temporally-neighboring block. In some examples, for each candidate picture in the candidate picture list, the video coder may determine three candidate regions. The three candidate regions may be defined as follows:

CPU: A co-located region of the current PU or current CU.
CLCU: A largest coding unit (LCU) covering the co-located region of the current PU.
BR: A bottom-right 4×4 block of the CPU.

Because smaller blocks in a 16×16 block share the same motion information as a result of motion compression, the video coder may check only one sample block for a disparity vector. When a candidate region covers more than one 16×16 block, the video coder may check all 16×16 blocks in the candidate region according to a raster scan order. For instance, a motion vector for a temporally co-located block is stored in a 16×16 block of a reference picture, and, typically, the video coder accesses a 4×4 block to find a motion vector. Thus, if the video coder places the candidate block in a 16×16 block, all the 4×4 blocks contain a common motion vector, and the video coder does not need to check all the 4×4 blocks to find a different motion vector. On the other hand, if the candidate region is larger than 16×16, the 4×4 blocks outside the 16×16 block may contain a different motion vector.

When the video coder checks a candidate region (or a 16×16 block within a candidate region), the video coder may determine whether a PU that covers the candidate region specifies a disparity motion vector. If the PU that covers the candidate region specifies a disparity motion vector, the video coder may determine the disparity vector of the current block based on the disparity motion vector of the PU.

In some examples, the video coder may perform a priority-based disparity vector determination as part of performing an NBDV derivation process. For example, the video coder may derive the disparity vector such that once the video coder identifies a neighboring block that contains a disparity motion vector, the video coder converts the disparity motion vector to the disparity vector for the current block. The video coder may then use the disparity vector for inter-view motion prediction and/or inter-view residual prediction. In some examples, the checking order of neighboring blocks is defined based on the correlation between the neighboring blocks and the current block. For instance, the video coder may firstly check spatial neighboring blocks one by one. Once the video coder has identified a disparity motion vector, the video coder returns the disparity motion vector as the disparity vector. In some examples, the checking order of the five spatial neighboring blocks is defined as $A_1$, $B_1$, $B_0$, $A_0$ and $B_2$.

Furthermore, for each candidate picture in the candidate picture list, the video coder may check three candidate regions in this candidate picture in order. The checking order of the three regions is defined as: CPU, CLCU and BR for the first non-base view or BR, CPU, CLU for the second non-base view. In this example, decoding of pictures associated with the first non-base view may depend on decoding of pictures associated with a base view, but not pictures associated with other views. Furthermore, in this example, decoding of pictures associated with the second non-base view may depend on decoding of pictures associated with the base view and, in some instances, the first non-base view, but not pictures associated with other views, if present. For simplicity, the disparity motion vectors in the spatial neighboring blocks may be denoted as SDVs and the disparity motion vectors in the temporal neighboring blocks may be denoted as TDVs.

When the video coder checks the motion vector(s) of a block (i.e., a spatially-neighboring block, a candidate region of a candidate picture, or a 16×16 block of a candidate region of a candidate picture), the video coder may determine whether the motion vector(s) of the block are disparity motion vectors. A disparity motion vector of a block of a picture is a motion vector pointing to a location within a disparity reference picture of the picture. A disparity reference picture of a given picture may be a picture that is associated with the same access unit as the given picture, but is associated with a different view than the given picture. When the video coder identifies a disparity motion vector, the video coder may terminate the checking process. The video coder may convert the returned disparity motion vector to a disparity vector and may use the disparity vector for inter-view motion prediction and inter-view residual prediction. For example, the video coder may set a horizontal component of the disparity vector for the current block equal to a horizontal component of the disparity motion vector and may set the vertical component of the disparity vector to 0.

When the video coder checks a spatially-neighboring PU, the video coder may first check whether the neighboring PU has a disparity motion vector. If none of the spatially-neighboring PUs has a disparity motion vector, the video coder may determine whether any of the spatially-neighboring PUs has an IDV. An IDV may be a disparity vector of a spatially- or temporally-neighboring PU (e.g., a PU that is coded using inter-view motion prediction or inter-view residual prediction). For example, when a video coder codes a block with inter-view motion prediction, the video coder may need to derive a disparity vector for selecting a corresponding block in a different view. In this example, the term "IDV" may refer to the disparity vector derived in the inter-view motion prediction. Even though the block may be coded with temporal motion prediction, the video coder does not discard the derived disparity vector for the purpose of coding one or more following blocks. In this way, an IDV may be stored to the block for the purpose of disparity vector derivation.

In some examples where the video coder checks IDVs as part of the NBDV derivation process, the video coder may perform the following steps. If any of the following steps find a disparity vector, the video coder may terminate the derivation process.

Step 1: Check the five spatial neighboring blocks in the order of $A_1$, $B_1$, $B_0$, $A_0$ and $B_2$ to find a disparity motion vector. Once a disparity motion vector is found, the video coder converts the disparity motion vector to a disparity vector. If the spatial neighboring blocks contain IDVs, the video coder marks their IDV flags as "IDV used" and stores the associated values of the IDV flags.

Step 2: When temporal motion vector prediction is enabled, the following applies:
  a) If the current coding mode is AMVP, the reference picture with the target reference index in the target reference picture list is used as the co-located picture. Two blocks in the co-located picture are defined (i.e., the bottom right block of the co-located PU (BR) and the center block of the co-located PU (CB)). In this example, the video coder checks the blocks of the co-located picture in the following order:
    1) Check BR to see whether BR contains a disparity motion vector. If yes, the video coder converts the disparity motion vector to a disparity vector. Otherwise, if BR is coded as the skip mode and BR contains an IDV (i.e., the flag of IDV is equal to 1), the video coder marks BR as "IDV used" and stores the associated IDV. The video coder may then perform step 3.
    2) Check CB to see whether CB contains a disparity motion vector. If yes, the video coder converts the disparity motion vector to a disparity vector. Otherwise, if BR is coded as the skip mode and BR contains an IDV (i.e., the flag of IDV is equal to 1), the video coder marks BR as "IDV used" and the video coder stores the associated IDV. The video coder may then perform step 3.
  b) If the current coding mode is skip/merge, the video coder uses two co-located reference pictures in each reference picture list, if applicable. The reference indexes that indicate the co-located reference pictures may be equal to the reference index of the left neighboring PU or 0. For each of the co-located pictures in the reference picture lists 0 and 1, the video coder performs the steps in a) 1) and a) 2) in order.

Step 3: If one of the five spatial neighboring blocks is coded using skip mode and the spatial neighboring block contains an IDV (i.e., the spatial neighboring block has a flag marked as "IDV used"), the video coder returns the IDV as a disparity vector. In this example, the checking order of spatial neighboring blocks for IDVs is $A_0$, $A_1$, $B_0$, $B_1$, and $B_2$.

Step 4: If temporal motion vector prediction is enabled and there is one block in the co-located picture (i.e., BR or CB) that is marked as "IDV used," the video coder converts the IDV associated with the block to a disparity vector.

The memory bandwidth and complexity requirements associated with accessing an IDV in a decoded picture buffer (DPB) may be large. For instance, in order to determine whether a neighboring block has an IDV during the NBDV derivation process, the video coder may need to reconstruct an AMVP or merge candidate list of the neighboring block and identify an inter-view motion vector candidate in the reconstructed AMVP or merge candidate list. Reconstruction of the AMVP or merge candidate list of the neighboring block may be relatively computationally and bandwidth intensive. Accordingly, a video coder may perform a low-complexity NBDV derivation process. The video coder considers fewer block candidates when the video coder performs the low complexity NBDV derivation process. For example, the video coder may store, in the DPB, information for IDVs. In this example, the extra information for IDVs may include IDV flags and vectors for all the previously-coded pictures. Furthermore, in a low complexity NBDV derivation process, removing the IDV candidates in the DPB can reduce the memory bandwidth. In other words, the video coder does not store IDV-related information in the DPB.

Figure 5:
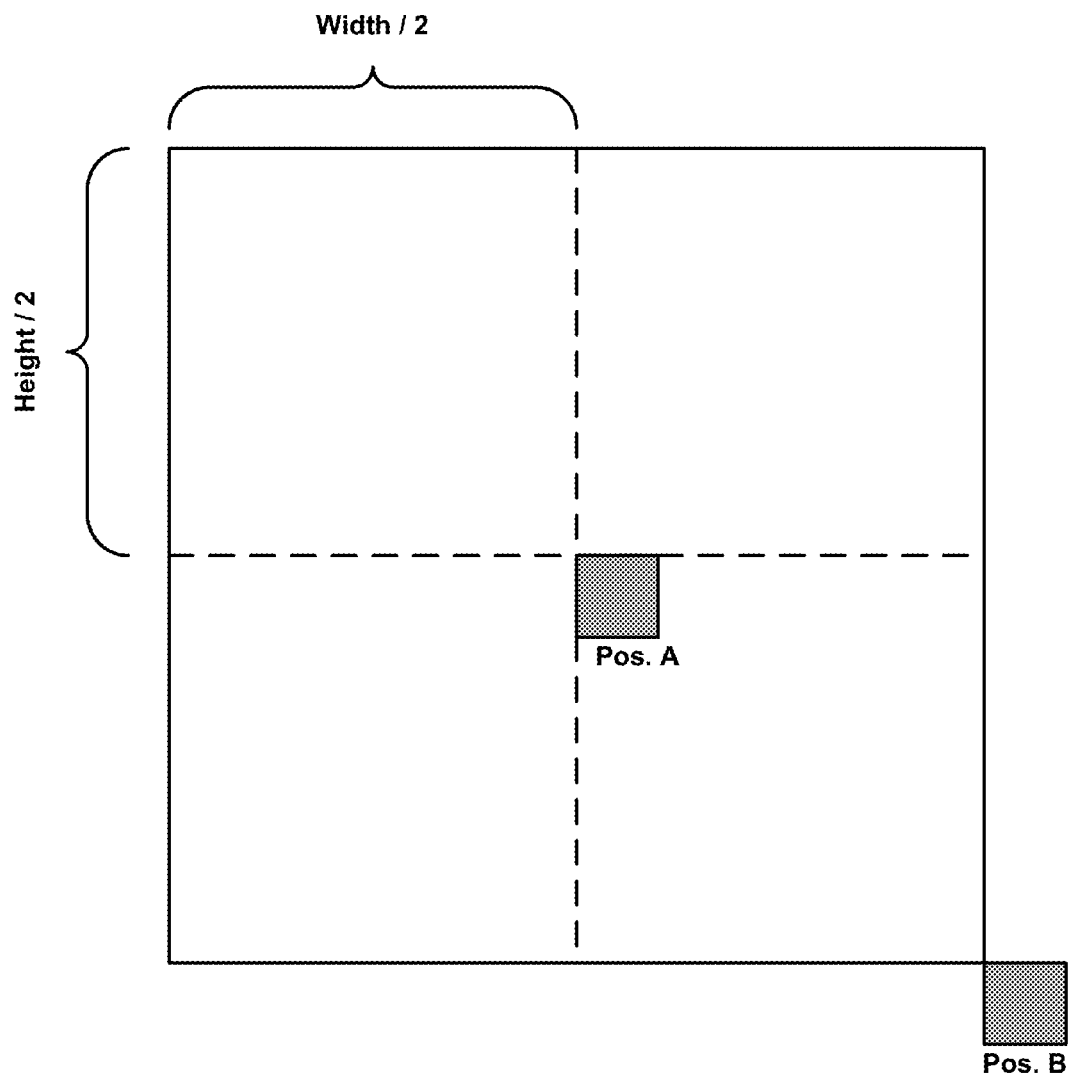
FIG. 5 is a conceptual diagram illustrating example temporal neighbors in a corresponding PU of temporal candidate pictures.

In some low-complexity NBDV derivation processes, the video coder checks fewer candidate regions of candidate pictures than in the NBDV derivation process described above. For example, FIG. 5 is a conceptual diagram illustrating temporal neighbors in a corresponding PU of a temporal candidate picture. In the example of FIG. 5, the video coder may check candidate regions covering this positions indicated by "Pos. A" and "Pos. B." Furthermore, in some low-complexity NBDV derivation processes, the video coder may check candidate regions of only a co-located picture and a random access picture. Thus, in some examples, a co-located picture and a random access picture are considered for temporal block checks (i.e., bottom-below and center blocks as shown in FIG. 5).

Furthermore, in some low-complexity NBDV derivation processes, the video coder may perform the candidate picture derivation in a slice or picture level once. In other words, the video coder may generate the candidate picture list for use in the NBDV derivation process once per picture or slice. Consequently, in such low-complexity NBDV derivation processes, the video coder no longer invokes the candidate picture derivation process at the PU or CU level.

The processes for deriving a disparity vector in 3D-HEVC may potentially have the following issues. For example, the NBDV derivation process is invoked in every PU for inter-view motion prediction, which may significantly increase computational complexity. Furthermore, the number of the spatial neighboring blocks checked during the NBDV derivation process is potentially large and some spatial neighboring blocks might not need to be checked to achieve the same or similar coding efficiency.

The techniques of this disclosure may provide several improvements and simplifications for the disparity vector derivation process (i.e., NBDV) in 3D-HEVC. For example, CU-based disparity vector derivation may be a way that disparity derivation process is only invoked once for a CU, and all the PUs inside the CU share the same derived disparity vector, for inter-view prediction, including e.g., inter-view motion prediction, and inter-view residual prediction. The CU-based disparity vector derivation may result in decreasing of computational complexity and enhancing of parallel processing.

For example, video encoder 20 may generate a bitstream that includes a coded representation of video data. As part of generating the bitstream, video encoder 20 may perform a disparity vector derivation process to derive a disparity vector for a representative block in a plurality of blocks. In this example, the video data includes a parent block that is partitioned into the plurality of blocks. Furthermore, in this example, video encoder 20 may generate a bitstream that includes a coded representation of the video data in part by performing, based on the derived disparity vector and without separately deriving disparity vectors for any block in the plurality of blocks other than the representative block, inter-view prediction for two or more blocks in the plurality of blocks (i.e., two or more blocks of the parent block).

In another example, video decoder 30 may perform a disparity vector derivation process to derive a disparity vector for a representative block in a plurality of blocks. In this example, the video data includes a parent block that is partitioned into the plurality of blocks. Furthermore, in this example, video decoder 30 may reconstruct sample blocks for two or more blocks in the plurality of blocks (e.g., parent block) in part by performing, based on the derived disparity vector and without separately deriving disparity vectors for any block in the plurality of blocks other than the representative block, inter-view prediction for the two or more blocks in the plurality of blocks.

In another example technique of this disclosure, a video coder (e.g., video encoder 20 or video decoder 30) may perform a modified NBDV derivation process to derive a disparity vector for a PU. When the video coder performs the modified NBDV derivation process, the video coder checks fewer spatial neighboring blocks to derive SDVs and/or IDVs than the NBDV derivation process described in 3D-HEVC Test Model 1. For example, when the video coder performs the modified NBDV derivation process, the video coder only checks the left block and the above block (denoted as $A_1$ and $B_1$ in FIG. 2). Furthermore, in this example, the video coder may check the left block and then check the above block. In other examples, the video coder may check the above block and then check the left block. The modified NBDV derivation process of this disclosure may result in minimal change to coding gain and reduced complexity relative to the NBDV derivation process described in 3D-HEVC Test Model 1.

For example, video encoder 20 may perform a disparity vector derivation process to determine a disparity vector for a current block. As part of performing the disparity vector derivation process, video encoder 20 may convert, when either a first or a second spatial neighboring block has a disparity motion vector or an IDV, the disparity motion vector or the IDV to the disparity vector for the current block. In this example, the disparity vector derivation process does not determine whether any spatial neighboring blocks in addition to the first and second spatial neighboring blocks have disparity motion vectors or IDVs even if neither of the first or the second spatial neighboring blocks has a disparity motion vector or an IDV. In some examples, the first spatial neighboring block is adjacent to a top edge of the current block (i.e., the above neighboring block) and the second spatial neighboring block is adjacent to a left edge of the current block (i.e., the left neighboring block). This disclosure may refer to an exterior edge of a block of samples corresponding to a block (e.g., a coding tree block of a CTU, a coding block of a CU, a prediction block of a PU, etc.) as an edge of the block. Furthermore, in such examples, video encoder 20 may generate, based in part on the derived disparity vector for the current block, an encoded representation of the current block.

In another example, video decoder 30 may perform a disparity vector derivation process to determine a disparity vector for a current block. As part of performing the disparity vector derivation process, video decoder 30 may convert, when either a first or a second spatial neighboring block has a disparity motion vector or an IDV, the disparity motion vector or the IDV to the disparity vector for the current block. The disparity vector derivation process does not determine whether any spatial neighboring blocks in addition to the first and second spatial neighboring blocks have disparity motion vectors or IDVs even if neither of the first or the second spatial neighboring blocks has a disparity motion vector or an IDV. In some examples, the first spatial neighboring block is adjacent to a left edge of the current block (i.e., the left neighboring block) and the second spatial neighboring block is adjacent to a top edge of the current block (i.e., the above neighboring block). Furthermore, video decoder 30 may reconstruct a sample block for the current block in part by performing, based on the derived disparity vector, inter-view prediction for the current block.

As another example potential issue with the process for deriving a disparity vector in 3D-HEVC, a video coder stores a flag associated in every block to indicate whether a spatial neighboring block contains an IDV or not. Storing such flags may increase memory requirements in a system. Furthermore, each block may contain up to two IDVs (i.e., an IDV corresponding to RefPicList0 and an IDV corresponding to RefPicList1). In the techniques described in this disclosure, the storage of such flags may not be necessary.

In accordance with an example technique of this disclosure, IDVs are represented in a simple way, such that there is no flag used in addition to signal whether a spatial neighboring block contains an IDV. Furthermore, a reference index, a reference view index or a difference of reference view index is signaled for a block and an illegal reference index (i.e., 1), illegal reference view index (e.g., the same as the current view), and/or illegal difference of reference view index (e.g., 0) indicates that an implicit disparity vector is not present for a block. In addition, only one disparity vector may be present for one spatial neighboring block.

Thus, in some such examples, no flag is signaled to indicate whether a spatial neighboring block contains an IDV. For instance, video encoder 20 may signal no flag to indicate whether a spatial neighboring block contains an IDV. Moreover, in some such examples, one of the following indicates that an IDV is present for a neighboring block: an illegal reference index; an illegal reference view index; and an illegal difference of reference view indexes. For instance, video encoder 20 may signal one of the following to indicate that an IDV is present for the neighboring block: an illegal reference index; an illegal reference view index; and an illegal difference of reference view indexes.

The example techniques of this disclosure may be used separately or in conjunction. That is, any of the technical aspects of this disclosure can be combined in a complete solution for disparity vector derivation.

Figure 6:
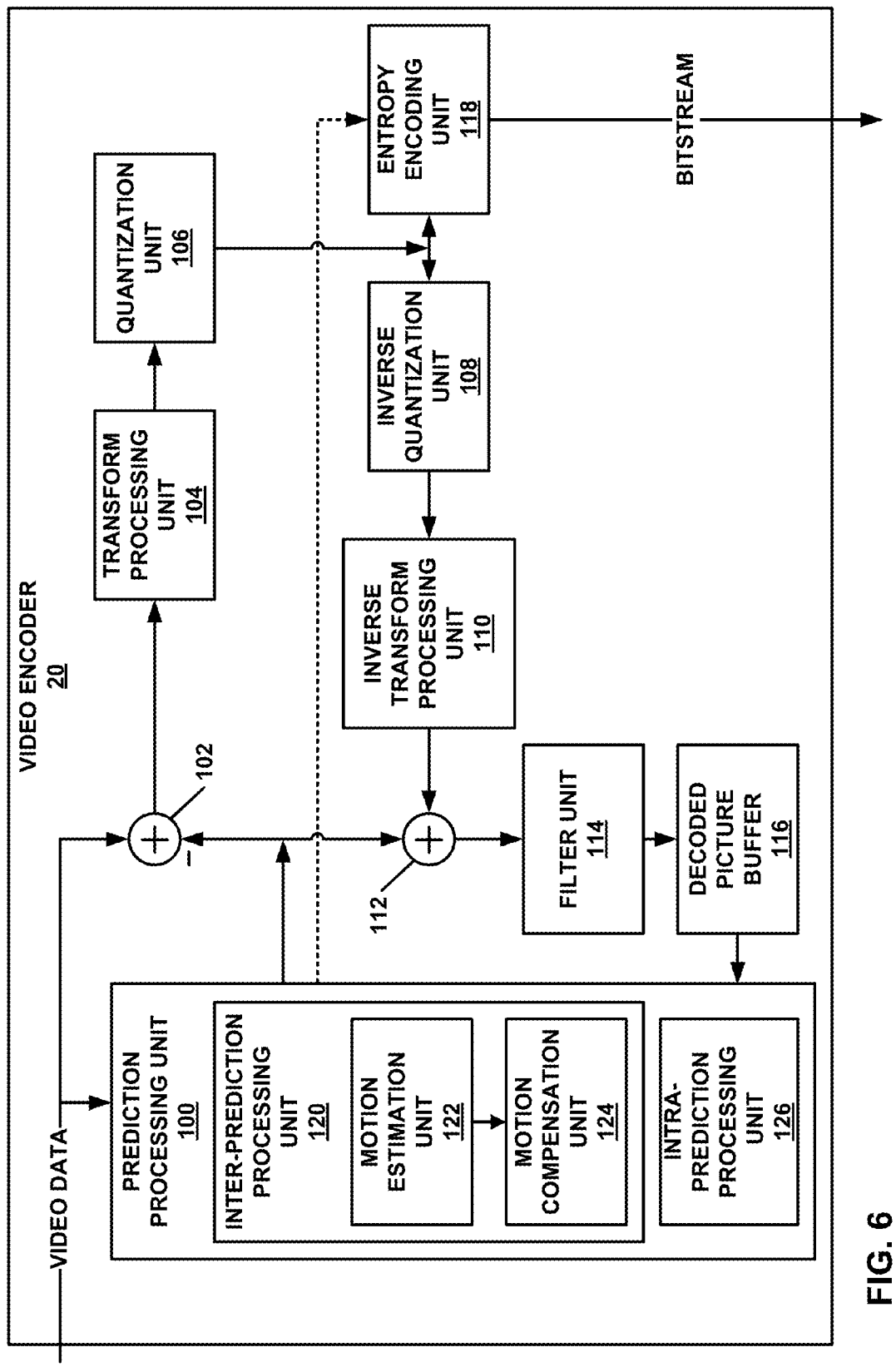
FIG. 6 is a block diagram illustrating an example video encoder that may implement the techniques described in this disclosure.

FIG. 6 is a block diagram illustrating an example video encoder 20 that may implement the techniques of this disclosure. FIG. 6 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 6, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding blocks of a CU and the selected predictive luma, Cb and Cr blocks of the PUs of the CU, luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

In accordance with one or more techniques of this disclosure, a parent block is partitioned into the plurality of blocks and a disparity vector derivation process is performed to derive a disparity vector for a representative block in the plurality of blocks. Video encoder 20 may generate a bitstream that includes a coded representation of the video data in part by performing, based on the derived disparity vector and without separately deriving disparity vectors for any block in the plurality of blocks other than the representative block, inter-view prediction (e.g., inter-view motion prediction and/or inter-view residual prediction) for two or more blocks in the plurality of blocks. Furthermore, in some example techniques of this disclosure, video encoder 20 may perform a disparity vector derivation process to determine a disparity vector for a current block. As part of performing the disparity vector derivation process, when either a first or a second spatial neighboring block has a disparity motion vector or an implicit disparity vector, video encoder 20 may convert the disparity motion vector or the implicit disparity vector to the disparity vector for the current block. The disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector.

Figure 7:
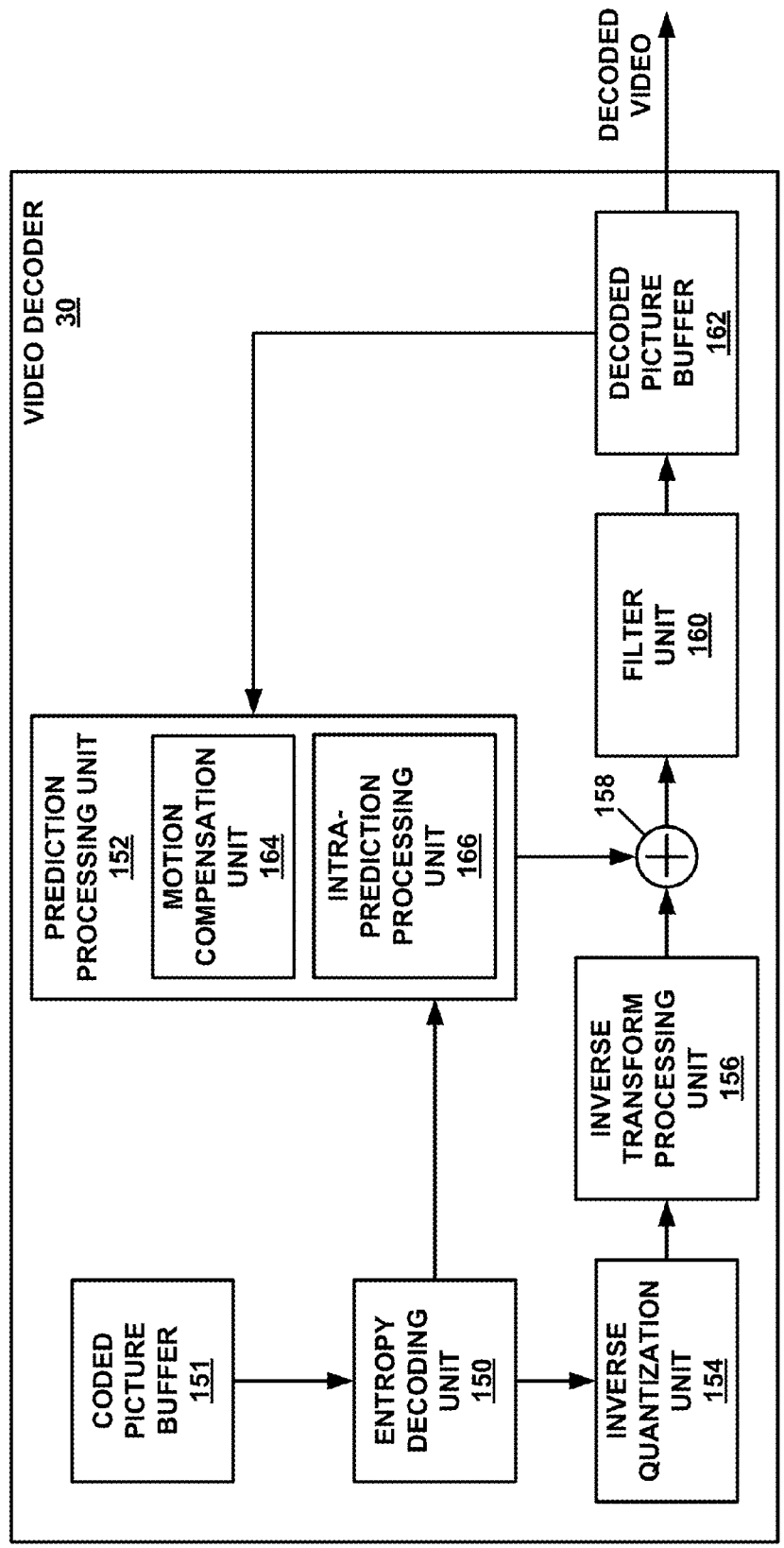
FIG. 7 is a block diagram illustrating an example video decoder that may implement the techniques described in this disclosure.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 7, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., dequantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb, and Cr blocks for the PU.

Reconstruction unit 158 may use the residual values from the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

In accordance with one or more techniques of this disclosure, a parent block (e.g., a CTU, CU, etc.) may be partitioned into the plurality of blocks and a disparity vector derivation process is performed to derive a disparity vector for a representative block in the plurality of blocks. Video decoder 30 may reconstruct sample blocks for two or more blocks in the plurality of blocks in part by performing, based on the derived disparity vector and without separately deriving disparity vectors for any block in the plurality of blocks other than the representative block, inter-view prediction for the two or more blocks in the plurality of blocks. Furthermore, in some examples, video decoder 30 may perform a disparity vector derivation process to determine a disparity vector for a current block. As part of performing the disparity vector derivation process, when either a first or a second spatial neighboring block has a disparity motion vector or an IDV, video decoder 30 may convert the disparity motion vector or the IDV to the disparity vector for the current block. The disparity vector derivation process does not determine whether any spatial neighboring blocks in addition to the first and second spatial neighboring blocks have disparity motion vectors or IDVs even if neither of the first or the second spatial neighboring blocks has a disparity motion vector or an IDV.

As described above, a video coder may perform a CU-based NBDV derivation process to derive disparity vectors for each PU of a CU. When the video coder performs the CU-based NBDV derivation process to derive disparity vectors for each PU of a CU, the video coder performs a NBDV derivation process once for the CU and the video coder assigns the derived disparity vector to all PUs of the CU. In other words, the CU-based NBDV derivation process can be done in a way that all PUs and the CU itself shares the same disparity vector derived once based on the NBDV derivation process, e.g., as derived in 3D-HEVC. The NBDV derivation process is applicable to a representative block (e.g., a PU or CU). For example, a CU may be partitioned into a plurality of PUs and a video coder may perform a disparity vector derivation process to derive a disparity vector for a representative PU in the plurality of PUs (e.g., in the CU).

Furthermore, the CU-based NBDV derivation process can be extended to LCU-based NBDV derivation process as a straightforward extension, or an NBDV derivation process for any block size. For example, an LCU may be partitioned into a plurality of CUs and a video coder may perform a disparity vector derivation process to derive a disparity vector for a representative CU in the plurality of CUs.

As described above, the video coder may check five spatial neighboring blocks when performing a NBDV derivation process. The five spatial neighboring blocks may be located as in NBDV by always considering only one representative PU for the whole CU.

In this disclosure, the representative PU of the plurality of PUs may be called an NBDV-processing unit (NPU). In other examples, the video coder may set the NPU in various ways. For example, the NPU may be the current CU. In another example, the NPU may be a first PU in a current CU. In this example, the first PU is defined to be the PU covering the left-top pixel of the CU.

In another example, the video coder may choose, as the representative block, the PU covering the bottom-right pixel of the CU to be the representative PU. In other words, the video coder may choose the PU covering the bottom-right pixel of the CU as the NPU. In another example, the video coder may choose, as the representative block, the PU covering the top-right pixel of the CU to be the representative PU. In other words, the video coder may choose, as the representative block, the PU covering the top-right pixel of the CU as the NPU. In still another example, the video coder may choose the PU covering the bottom-left pixel of the CU to be the representative PU. In other words, the video coder may choose the PU covering the bottom-left pixel of the CU as the NPU. In this disclosure, for ease of explanation, the bottom-right pixel, the top-right pixel, or the bottom-left pixel of a CU may be the bottom-right pixel, the top-right pixel, or the bottom-left pixel, respectively, of a coding block of the CU.

Figure 8:
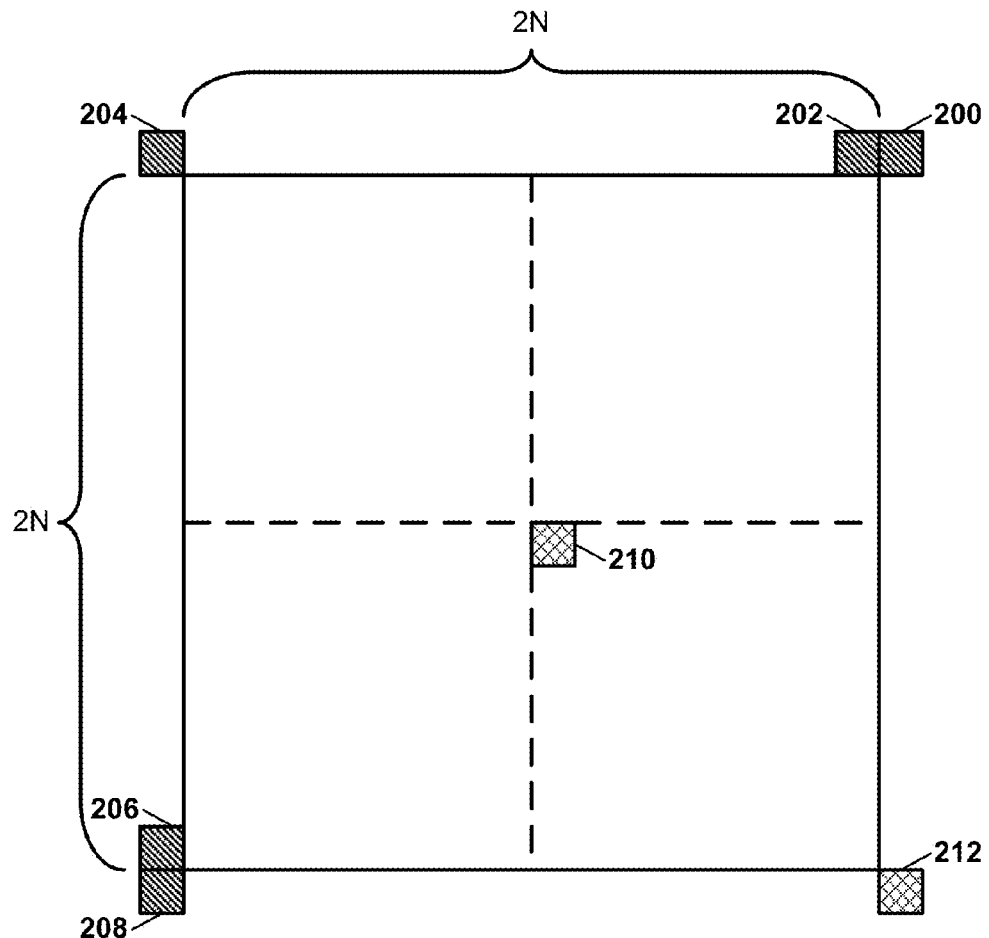
FIG. 8 is a conceptual diagram illustrating example spatial and temporal neighbors in a 2N×2N PU which is identical with a coding unit (CU).

FIG. 8 is a conceptual diagram illustrating example spatial and temporal neighbors in a 2N×2N PU which is identical with a CU. In the example of FIG. 8, the video coder may perform an NBDV derivation process in which the video coder checks blocks covering locations 200, 202, 204, 206, and 208 for disparity motion vectors and IDVs. Furthermore, in the example of FIG. 8, when the video coder performs the NBDV derivation process, the video coder may check blocks that are in candidate reference pictures and that are co-located with locations 210 and 212.

Figure 9:
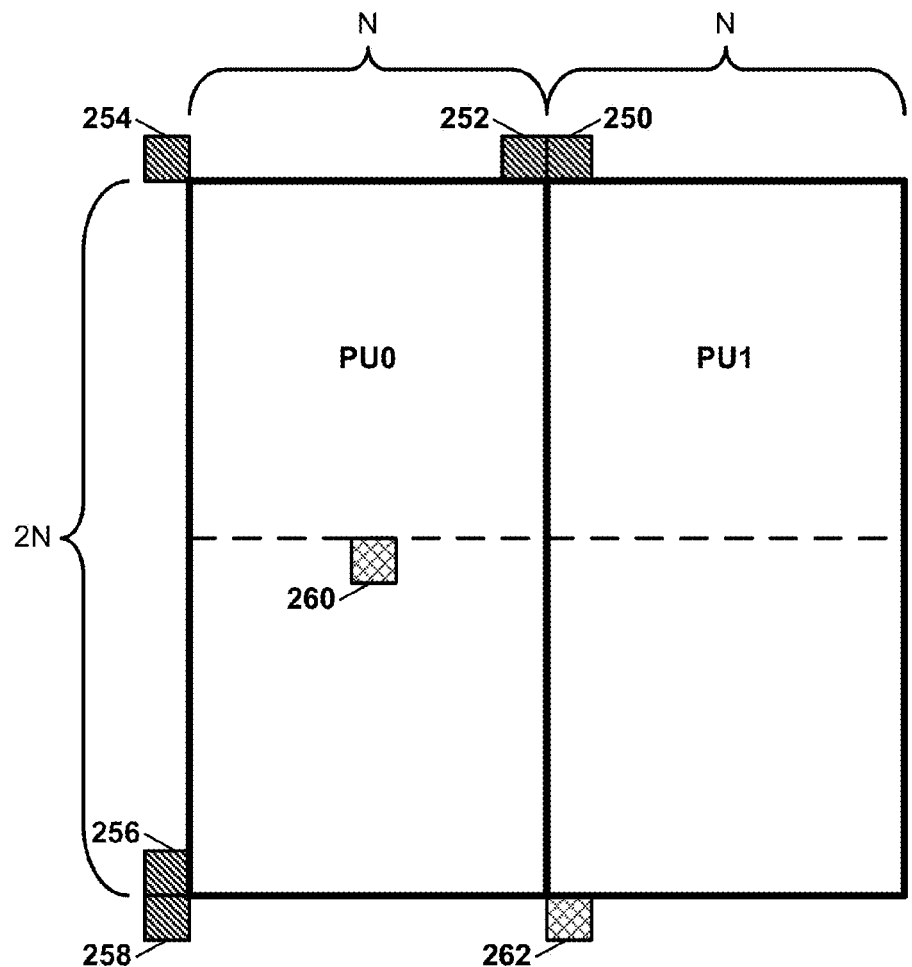
FIG. 9 is a conceptual diagram illustrating example spatial and temporal neighboring blocks used in a Neighboring Blocks-based Disparity Vector (NBDV) derivation process where a first PU of a CU is a representative PU for the CU.

FIG. 9 is a conceptual diagram illustrating example spatial and temporal neighboring blocks used in an NBDV derivation process where a first PU of a CU is a representative PU for the CU. In the example of FIG. 9, the representative block is an N×2N PU at the left of the CU. In other words, FIG. 9 is an example where a PU has an N×2N shape. With given partition information of the current CU (e.g. N×2N), the block positions can be decided with those of the first PU (e.g. the left PU). FIG. 9 is an example of how the block positions (i.e., the locations covered by neighboring blocks) may be decided based on the shape of the first PU.

In particular, in the example of FIG. 9, the video coder may perform an NBDV derivation process in which the video coder checks blocks covering locations 250, 252, 254, 256, and 258 for disparity motion vectors and IDVs. Furthermore, in the example of FIG. 9, when the video coder performs the NBDV derivation process, the video coder may check blocks that are in candidate reference pictures and that are co-located with locations 260 and 262. As can be seen in the examples of FIGS. 8 and 9, the locations covered by the neighboring blocks used in the NBDV derivation process may be different for PUs of a CU depending on how the CU is partitioned into PUs and which of the PUs is the representative block. Thus, the video coder may determine a plurality of block positions based on a shape of the first PU, wherein each respective block position in the plurality of block positions is covered by a respective neighboring block in a plurality of neighboring blocks. Furthermore, the video coder may check one or more of the neighboring blocks for a spatial disparity motion vector, an implicit disparity vector, or a temporal disparity motion vector.

Figure 10:
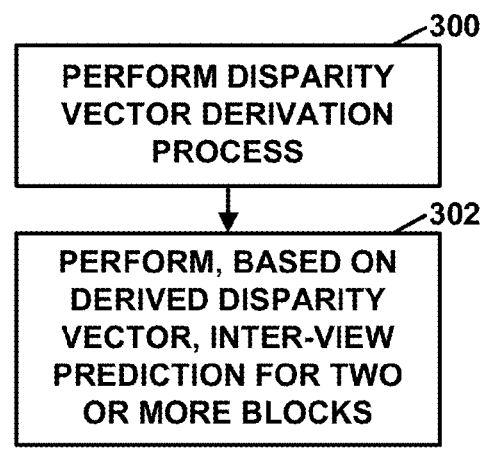
FIG. 10 is a flowchart illustrating an example operation of a video coder, in accordance with one or more techniques of this disclosure.

FIG. 10 is a flowchart illustrating an example operation of a video coder, in accordance with one or more techniques of this disclosure. As illustrated in the example of FIG. 10, a video coder (e.g., video encoder 20 or video decoder 30) may perform a disparity vector derivation process to derive a disparity vector for a representative block in a plurality of blocks (300). In the example of FIG. 10, video data may include a parent block that is partitioned into the plurality of blocks. For example, the parent block may be a CU and each block in the plurality of blocks may be a PU of the CU. In this example, the representative block may be the first PU of the CU. In another example, the parent block may be an LCU, each block in the plurality of blocks may be a CU, and the representative block may be one of the CUs of the LCU.

Furthermore, the video coder may perform, based on the derived disparity vector and without separately deriving disparity vectors for any block in the plurality of blocks other than the representative block, inter-view prediction for the two or more blocks in the plurality of blocks (302). In some examples where the video coder is a video decoder, the video decoder may reconstruct sample blocks for two or more blocks in the plurality of blocks in part by performing, based on the derived disparity vector and without separately deriving disparity vectors for any block in the plurality of blocks other than the representative block, inter-view prediction for the two or more blocks in the plurality of blocks. Similarly, in some examples where the video coder is a video encoder, the video encoder may generate a bitstream that includes a coded representation of the video data in part by performing, based on the derived disparity vector and without separately deriving disparity vectors for any block in the plurality of blocks other than the representative block, inter-view prediction for the two or more blocks in the plurality of blocks. When the video coder performs inter-view prediction for the two or more blocks, the video coder may perform, based on the derived disparity vector, one or more of inter-view motion prediction and inter-view residual prediction for the two or more blocks.

FIG. 11A is a flowchart illustrating an example operation 350 of a video encoder for performing inter-view motion prediction, in accordance with one or more techniques of this disclosure. As illustrated in the example of FIG. 11A, the video encoder (e.g., video encoder 20) may determine a partitioning mode of a current CU (352). In accordance with one or more techniques of this disclosure, the video encoder may perform a disparity vector derivation process to determine a disparity vector for a representative PU of the current CU (354). In some examples where the representative block is a CU, the video encoder may perform the disparity vector derivation process at least in part by determining a plurality of neighboring blocks, wherein the plurality of neighboring blocks includes spatial neighboring blocks that are adjacent to the CU, a temporal neighboring block that covers a location co-located with a center of the CU, and a temporal neighboring block that covers a location immediately below and right of the CU. Furthermore, in such examples, the video encoder may check one or more of the neighboring blocks for a spatial disparity motion vector, an implicit disparity vector, or a temporal disparity motion vector.

Next, the video encoder may determine, based on the disparity vector for the representative PU, an inter-view prediction motion vector candidate (IPMVC) for a current PU (356). An IPMVC is a motion vector candidate that indicates a location in a reference picture that is associated with a different view than the current picture. The current PU is one of the PUs of the current CU. The video encoder may then include the IPMVC in a candidate list (e.g., a merge candidate list or an AMVP candidate list) for the current PU (358). Subsequently, the video encoder may select a candidate from the candidate list (360). In some instances, the selected candidate is the IPMVC. The video encoder may then include, in a bitstream, data indicating an index of the selected candidate (362). For example, if the candidate list is a merge candidate list, the video encoder may include, in the bitstream, data indicating a merge_idx syntax element. In another example, the candidate list is an AMVP candidate list and the video encoder may include, in the bitstream, data indicating an mvp_10_flag syntax element or an mvp_11_flag syntax element. In this example, the video encoder may also include data indicating a reference index (e.g., a ref_idx10 syntax element or a ref_idx11 syntax element) for the current PU and data indicating a motion vector difference (e.g., a mvd_coding syntax structure) for the current PU.

The video encoder may then determine whether there are any remaining PUs in the current CU (364). If there are one or more remaining PUs in the current CU ("YES" of 364), the video encoder may repeat actions 356-364 with one of the remaining PUs as the current PU. On the other hand, if there are no remaining PUs in the current CU ("NO" of 364), operation 350 ends and the video encoder may perform other encoding actions.

FIG. 11B is a flowchart illustrating an example operation 380 of a video decoder for performing inter-view motion prediction, in accordance with one or more techniques of this disclosure. As illustrated in the example of FIG. 11B, the video decoder (e.g., video decoder 30) may determine a partitioning mode of a current CU (382). In some examples, the video decoder may determine the partitioning mode of the current CU based on a part_mode syntax element of the current CU.

In accordance with one or more techniques of this disclosure, the video decoder may perform a disparity vector derivation process to determine a disparity vector for a representative PU of the current CU (384). For example, the video decoder may perform a disparity vector derivation process to determine a disparity vector for the first PU of the current CU. In some examples where the representative block is a CU, the video decoder may perform the disparity vector derivation process at least in part by determining a plurality of neighboring blocks, wherein the plurality of neighboring blocks includes spatial neighboring blocks that are adjacent to the CU, a temporal neighboring block that covers a location co-located with a center of the CU, and a temporal neighboring block that covers a location immediately below and right of the CU. Furthermore, in such examples, the video decoder may check one or more of the neighboring blocks for a spatial disparity motion vector, an IDV, or a temporal disparity motion vector.

Next, the video decoder may determine, based on the disparity vector for the representative PU, an IPMVC for a current PU (386). The current PU is one of the PUs of the current CU. The video decoder may then include the IPMVC in a candidate list (e.g., a merge candidate list or an AMVP candidate list) for the current PU (388). Subsequently, the video decoder may determine, based on data in a bitstream, a selected candidate in the candidate list (390). For example, if the candidate list is a merge candidate list, the video decoder may determine the selected candidate based on a merge_idx syntax element obtained from the bitstream. In another example, if the candidate list is an AMVP candidate list, the video decoder may determine the selected candidate based on a mvp_10_flag syntax element or an mvp_11_flag syntax element obtained from the bitstream. In some instances, the selected candidate is the IPMVC. The video decoder may then determine, based on the selected candidate, a motion vector for the current PU (392).

The video decoder may then determine whether there are any remaining PUs in the current CU (394). If there are one or more remaining PUs in the current CU ("YES" of 394), the video decoder may repeat actions 386-394 with one of the remaining PUs as the current PU. On the other hand, if there are no remaining PUs in the current CU ("NO" of 394), operation 380 ends and the video decoder may perform other decoding actions.

Figures 12A, 12B:
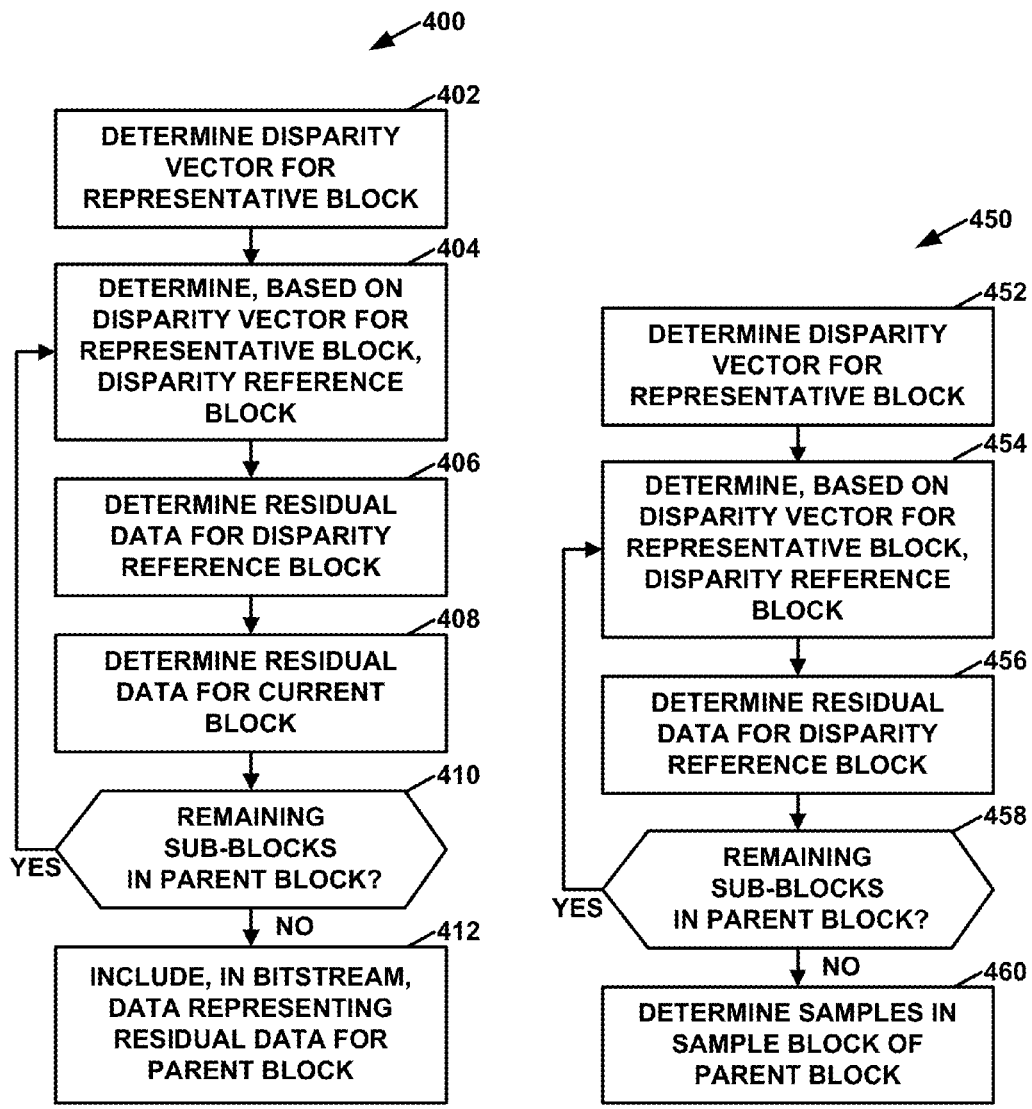
FIG. 12A is a flowchart illustrating an example operation of a video encoder for performing inter-view residual prediction, in accordance with one or more techniques of this disclosure.
FIG. 12B is a flowchart illustrating an example operation of a video decoder for performing inter-view residual prediction, in accordance with one or more techniques of this disclosure.

FIG. 12A is a flowchart illustrating an example operation 400 of a video encoder for performing inter-view residual prediction, in accordance with one or more techniques of this disclosure. As illustrated in the example of FIG. 12A, the video encoder (e.g., video encoder 20) may determine a disparity vector for a representative block of a parent block (402). In some examples, the parent block is partitioned into a plurality of blocks, including the representative block for the parent block. For instance, the representative block may be a CU and the parent block may be a CTU. In other instances, the representative block may be a PU and the parent block may be a CU. In other examples, the parent block is not partitioned into sub-blocks and the representative block for the parent block is the parent block itself. For instance, the representative block and the parent block may be the same PU, CU, CTU, etc.

Furthermore, in the example of FIG. 12A, the video encoder may determine, based on the disparity vector for the representative block, a disparity reference block for a current block (404). As indicated above, the parent block may be partitioned into one or more sub-blocks. The current block may be one of the sub-blocks. Furthermore, the disparity reference block for the current block may comprise a block of samples based on samples in a disparity reference picture. For instance, the disparity reference block may include samples of the disparity reference picture. The disparity reference picture is associated with the same time instance as the current block, but is associated with a different view than the current block.

The video encoder may determine residual data for the disparity reference block (406). The residual data for the disparity reference block may include samples indicating differences between samples of the disparity reference block and corresponding samples of one or more predictive blocks for the disparity reference block. The video encoder may then determine residual data for the current block (408). The residual data for the current block may include samples that indicate differences between corresponding samples in an original sample block for the current block, the residual data for the disparity reference block for the current block, and one or more predictive blocks. Subsequently, the video encoder may determine whether there are any remaining sub-blocks in the parent block (410). If there are one or more remaining sub-blocks in the parent block ("YES" of 410), the video encoder may repeat actions 404-410 with one of the remaining sub-blocks as the current block. In this way, the video encoder may use the disparity vector for the representative block to determine the disparity reference blocks for each of the sub-blocks of the parent block.

On the other hand, if there are no remaining sub-blocks in the parent block ("NO" of 410), the video encoder may include, in a bitstream, data representing residual data for the parent block (412). For example, if the parent block is a CTU and each of the sub-blocks is a CU, the data representing the residual data for the parent block may comprise data indicating transformed and quantized versions of the residual data of each of the CUs of the CTU. In another example, if the parent block is a CU and each of the sub-blocks is a PU, the data representing the residual data for the CU may include data indicating transformed and quantized versions of the residual data of each of the PUs of the CU.

FIG. 12B is a flowchart illustrating an example operation 450 of a video decoder for performing inter-view residual prediction, in accordance with one or more techniques of this disclosure. As illustrated in the example of FIG. 12B, the video decoder (e.g., video decoder 30) may determine a disparity vector for a representative block of a parent block (452). In some examples, the parent block is partitioned into a plurality of blocks, including the representative block for the parent block. For instance, the representative block may be a CU and the parent block may be a CTU. In other instances, the representative block may be a PU and the parent block may be a CU. In other examples, the parent block is not partitioned into sub-blocks and the representative block for the parent block is the parent block itself. For instance, the representative block and the parent block may be the same PU, CU, CTU, etc.

Furthermore, in the example of FIG. 12B, the video decoder may determine, based on the disparity vector for the representative block, a disparity reference block for a current block (454). As indicated above, the parent block may be partitioned into one or more sub-blocks. The current block may be one of the sub-blocks. Furthermore, the disparity reference block for the current block may comprise a block of samples based on samples in a disparity reference picture. For instance, the disparity reference block may include samples of the disparity reference picture. The disparity reference picture is associated with the same time instance as the current block, but is associated with a different view than the current block.

The video decoder may determine residual data for the disparity reference block (456). The residual data for the disparity reference block may include samples indicating differences between samples of the disparity reference block and corresponding samples of one or more predictive blocks for the disparity reference block. Subsequently, the video decoder may determine whether there are any remaining sub-blocks in the parent block (458). If there are one or more remaining sub-blocks in the parent block ("YES" of 458), the video decoder may repeat actions 454-458 with one of the remaining sub-blocks as the current block. In this way, the video decoder may use the disparity vector for the representative block to determine the disparity reference blocks for each of the sub-blocks of the parent block.

On the other hand, if there are no remaining sub-blocks in the parent block ("NO" of 458), the video decoder may determine a sample block (e.g., a coding tree block, a coding block, etc.) for the parent block (460). The sample block for the parent block may include samples that are the sum of corresponding samples in the residual data for the disparity reference blocks for the one or more sub-blocks of the parent block, one or more predictive blocks, and residual data signaled in a bitstream.

Figure 13:
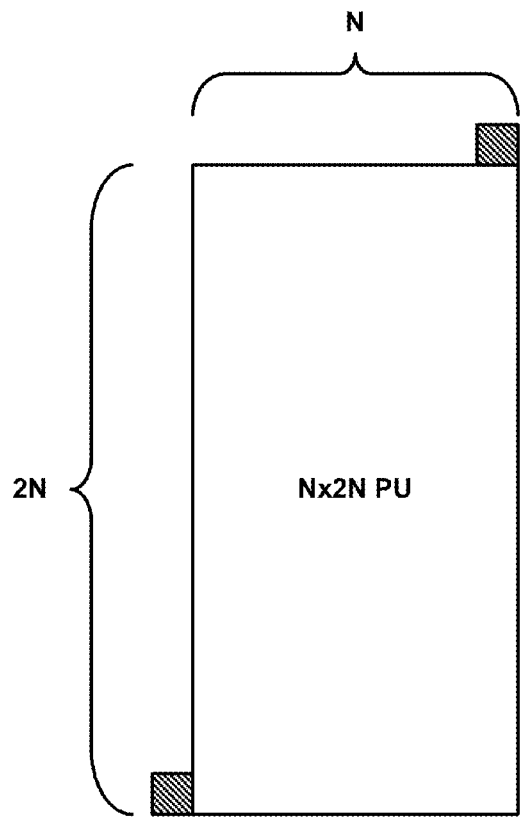
FIG. 13 is a conceptual diagram illustrating example left spatial neighboring blocks and above spatial neighboring blocks for two PUs.
Figure 13:
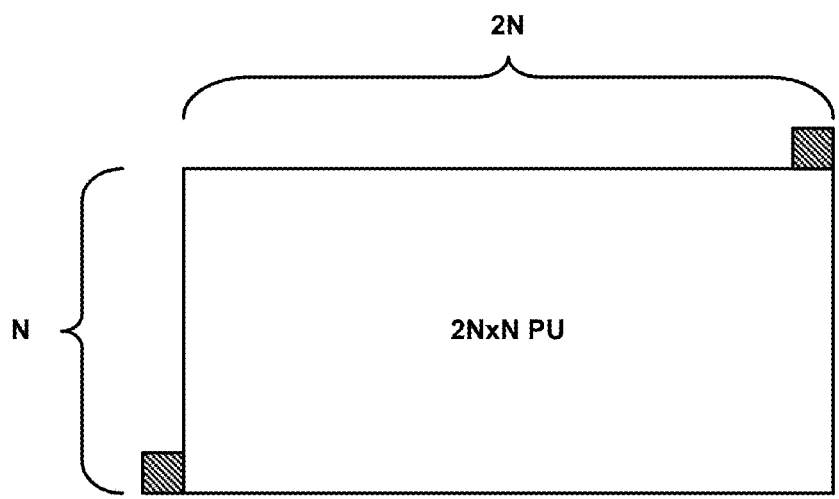

As described above, a video coder may, in accordance with the techniques of this disclosure, perform a modified NBDV derivation process that uses fewer spatial neighboring blocks than the NBDV derivation process described in 3D-HEVC Test Model 1. In one example, when the video coder performs the modified NBDV derivation process, the video coder may only consider the left spatial neighboring block and the above spatial neighboring block (i.e., the blocks denoted as $A_1$ and $B_1$ in FIG. 2). FIG. 13 is a conceptual diagram illustrating example left spatial neighboring blocks and above spatial neighboring blocks for two PUs. In particular, FIG. 13 shows left and above spatial neighboring blocks for an N×2N PU and a 2N×N PU. As shown in the example of FIG. 13, the left spatial neighboring block is adjacent to a left edge of the current block (e.g., the N×2N PU or the 2N×N PU) and the above spatial neighboring block is adjacent to a top edge of the current block (e.g., the N×2N PU or the 2N×N PU).

Figure 14:
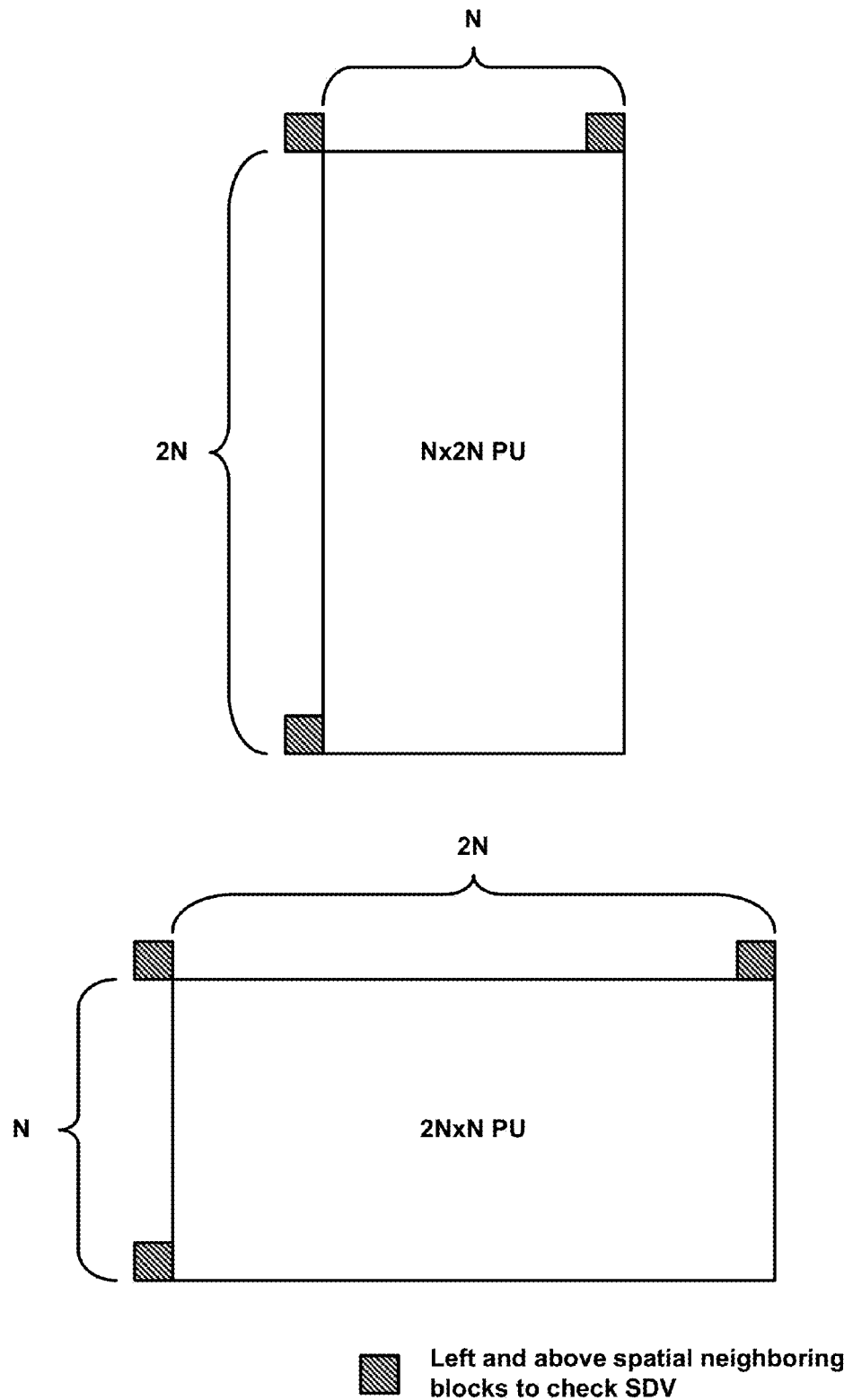
FIG. 14 is a conceptual diagram illustrating left, above, and above-left spatial neighboring blocks used in a NBDV derivation process.

However, instead of always considering the left and above 4×4 spatial neighboring blocks, there can be several alternatives so that the number of blocks to be checked becomes smaller. For example, in one solution, the video coder checks three spatial neighboring blocks. For instance, as shown in FIG. 14, the video coder checks only the above, left, and above-left spatial neighboring blocks. That is, FIG. 14 is a conceptual diagram illustrating left, above, and above-left spatial neighboring blocks used in a NBDV derivation process. In this example, the video coder may check the above, left, and above-left spatial neighboring blocks in that order. In other examples, the video coder may check the above, left, and above-left spatial neighboring blocks in any other order.

In other examples, the video coder may check any of the spatial neighboring blocks in the NBDV derivation process. In other words, any other spatial neighboring blocks may be decimated among the five spatial neighboring blocks $A_0$, $A_1$, $B_0$, $B_1$, and $B_2$ shown in FIG. 2. In some examples, the total number of blocks to be checked after the decimation can be greater than zero and less than five. Furthermore, in some examples, the video coder may check a subset of the five spatial neighboring blocks for disparity motion vectors, but may check all five spatial neighboring blocks for IDVs. In other words, in this example, the reduction may or may not be applied for the blocks wherein IDVs are to be searched. Furthermore, in some examples, the checking order of the spatial neighboring blocks can be re-ordered.

The reduction of spatial neighboring blocks can be combined with the CU-based NBDV derivation processes described elsewhere in this disclosure. For example, in the example of FIG. 13, the NPU is the PU covering the top-left pixel and the spatial neighboring blocks of the NPU are only the above spatial neighboring block and the left spatial neighboring block of the NPU. In another example, the NPU is the CU and the spatial neighboring blocks are the above, left and above-left spatial neighboring blocks of the CU, as shown in FIG. 14.

Figure 15:
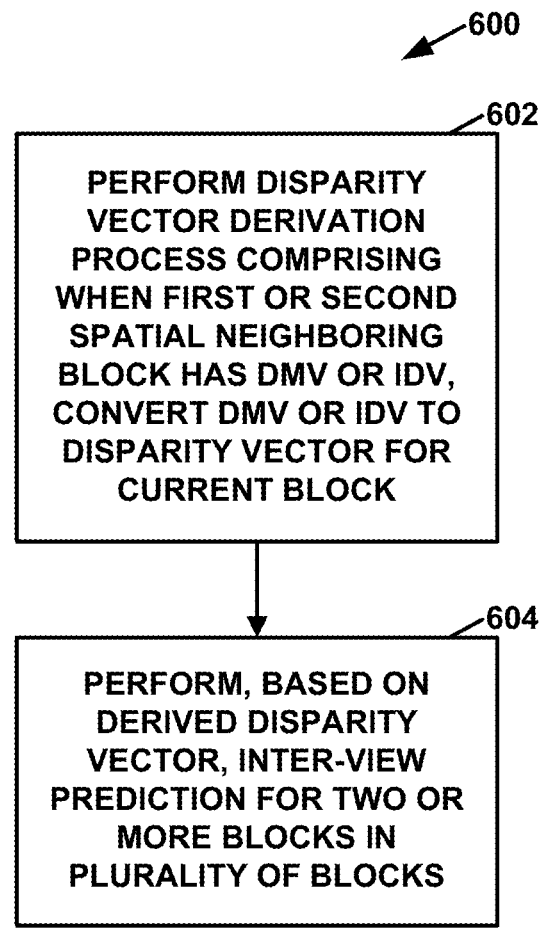
FIG. 15 is a flowchart illustrating an example operation of a video coder, in accordance with one or more techniques of this disclosure.

FIG. 15 is a flowchart illustrating an example operation 600 of a video coder, in accordance with one or more techniques of this disclosure. In the example of FIG. 15, a video coder (e.g., video encoder 20 or video decoder 30) performs a disparity vector derivation process to determine a disparity vector for a current block (602). In accordance with one or more techniques of this disclosure, as part of performing the disparity vector derivation process, the video coder may convert, when either a first or a second spatial neighboring block has a disparity motion vector or an IDV, the disparity motion vector or the IDV to the disparity vector for the current block. In the example of FIG. 15, the disparity vector derivation process does not determine whether any spatial neighboring blocks in addition to the first and second spatial neighboring blocks have disparity motion vectors or IDVs even if neither of the first or the second spatial neighboring blocks has a disparity motion vector or an IDV. In some examples, the first spatial neighboring block is adjacent to a top edge of the current block and the second spatial neighboring block is adjacent to a left edge of the current block. In some examples, the video coder may check the first spatial neighboring block for a disparity motion vector (or IDV) first and then may check the second spatial neighboring block for a disparity motion vector (or IDV). In other examples, the video coder may check the second spatial neighboring block for a disparity motion vector (or IDV) first and then may check the first spatial neighboring block for a disparity motion vector (or IDV).

Furthermore, in the example of FIG. 15, the video coder performs, based on the derived disparity vector and without separately deriving disparity vectors for any block in the plurality of blocks other than the representative block, inter-view prediction for the two or more blocks in the plurality of blocks (604). In some examples where the video coder comprises a video decoder, the video decoder reconstructs a sample block for the current block in part by performing, based on the derived disparity vector, inter-view prediction for the current block. In some examples where the video coder comprises a video encoder, the video encoder generates, based in part on the derived disparity vector for the current block, an encoded representation of the current block.

Figure 16:
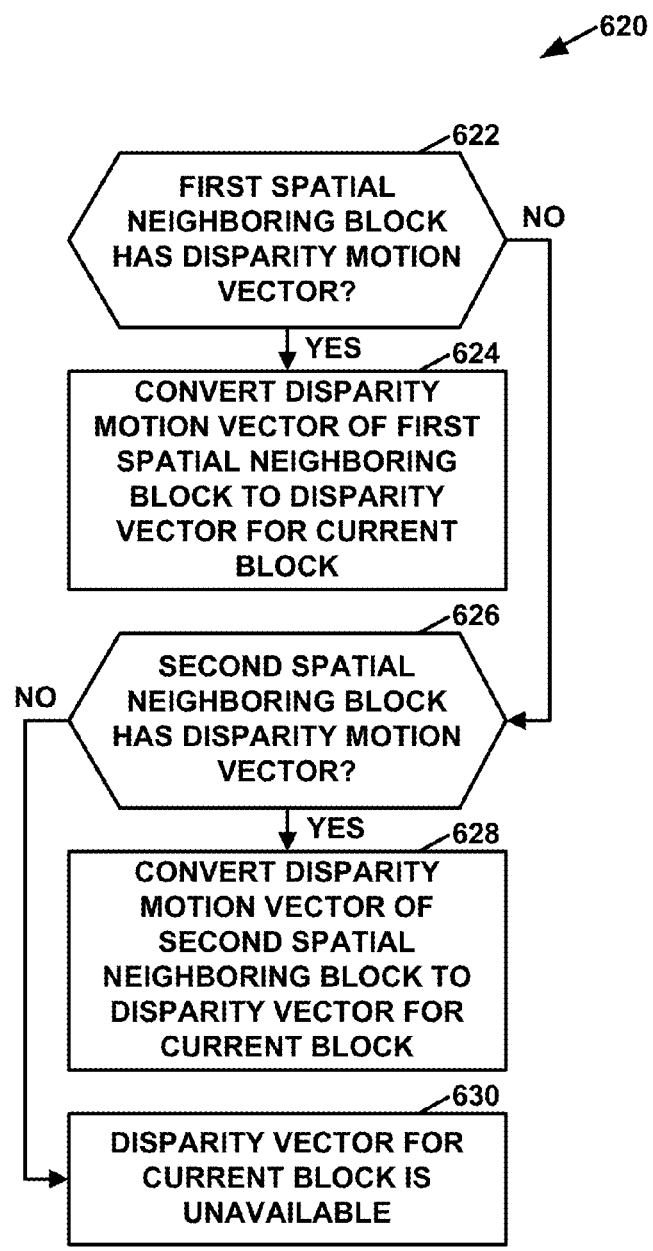
FIG. 16 is a flowchart illustrating an example operation of a video coder to determine a disparity vector for a current block, in accordance with an example of this disclosure.

FIG. 16 is a flowchart illustrating an example operation 620 of a video coder to determine a disparity vector for a current block, in accordance with an example of this disclosure. In the example of FIG. 16, the video coder uses up to two spatially neighboring blocks when determining a disparity vector for a current block. Specifically, in the example of FIG. 16, the video coder may determine whether a first spatial neighboring block has a disparity motion vector (622). In some examples, the first spatial neighboring block is adjacent to a left edge of the current block. In other examples, the first spatial neighboring block is adjacent to a top edge of the current block. In response to determining that the first spatial neighboring block has a disparity motion vector ("YES" of 622), the video coder may convert the disparity motion vector of the first spatial neighboring block into the disparity vector for the current block (624).

On the other hand, in response to determining that the first spatial neighboring block does not have a disparity motion vector ("NO" of 622), the video coder may determine whether a second spatial neighboring block has a disparity motion vector (626). In some examples, the second spatial neighboring block is adjacent to a left edge of the current block. In other examples, the second spatial neighboring block is adjacent to a top edge of the current block. In response to determining that the second spatial neighboring block has a disparity motion vector ("YES" of 626), the video coder may convert the disparity motion vector of the second spatial neighboring block into the disparity vector for the current block (628). Otherwise, in response to determining that the second spatial neighboring block does not have a disparity motion vector ("NO" of 626), the video coder may indicate that the disparity vector for the current block is unavailable (630).

As described above, in bi-predictive inter prediction, there can be up to two reference picture lists (i.e., RefPicList0 and RefPicList1). Furthermore, a bi-predictive block (e.g., a PU) contains two motion vectors. When both motion vectors (i.e., the motion vectors corresponding to RefPicList0 and RefPicList1, respectively) of the block are disparity motion vectors, the motion vector corresponding to RefPicList1 may be redundant.

In 3D-HEVC Test Model 1, a video coder determines whether a neighboring block uses a reference picture in RefPicList0. For instance, the video coder may check whether PredFlagL0[xN][yN] is equal to 1, where (xN, yN) is a location covered by the neighboring block and PredFlagL0 is an array of values indicating whether blocks covering particular coordinates utilize reference pictures in RefPicList0.

Furthermore, as described in 3D-HEVC Test Model 1, if the neighboring block uses a reference picture in RefPicList0, the video coder may determine whether a RefPicList0 reference index for the neighboring block indicates an inter-view reference picture in RefPicList0 and, if so, whether the inter-view reference picture has a view order index equal to a particular reference view index. For instance, the video coder may determine whether RefPicList0[RefIdxL0[xN][yN ]] is an inter-view reference picture with ViewOrderIndex equal to refViewIdx, where RefIdxLx0[xN][yN] is the RefPicList0 reference index for the neighboring block and refViewIdx is the particular view index. If so, the video coder may set the disparity vector equal to the RefPicList0 motion vector for the neighbor block. Otherwise, if the prediction mode of the neighboring block is skip mode and the neighboring block has an inter-view prediction motion vector flag that indicates that the neighboring block has an inter-view motion vector (e.g., which may occur when the neighboring block has an IDV), the video coder may set a variable (e.g., ivpMVDispN0) to the disparity vector of the neighboring block (e.g., IvpMvDispL0[xN, yN]). The video coder may then repeat this process for RefPicList1. A view order index may be a value (i.e., an index) that indicates the decoding order of view components in an access unit.

Thus, as described in section G.8.5.2.1.13 of JCT3V-A1005:

For each X from 0 to 1, the following applies, if availableN is equal to 1 and PredFlagLX[xN][yN] is equal to 1
   a. If RefPicListX[RefIdxLX[xN][yN ]] is an inter-view reference picture with ViewOrderIndex equal to refViewIdx, the following apply:

mvDisp=mvLXN[xN][yN]
      availableDV=1
   b. Otherwise, if PredMode[xN][yN] is equal to MODE_SKIP and IvpMvFlagLX[xN, yN] is equal to 1, the following apply:
      ivpMvDispNX=IvpMvDispLX[xN, yN]
      availableFlagIvpMvNX=1

In accordance with some techniques of this disclosure, a video coder may perform a pruning process in which the video coder does not check both RefPicList0 and RefPicList1 as described in 3D-HEVC Test Model 1. Rather, the video coder may check only one of the reference picture lists. For example, the video coder may check only RefPicList0. In other examples, the video coder may check only RefPicList1. Thus, in this pruning process, for a spatial or temporal neighboring block, to derive a disparity motion vector from this block instead of checking motion vectors corresponding to both RefPicList0 and RefPicList1, the video coder only checks the motion vector corresponding to RefPicList0 (RefPicList1).

For example, when a video coder perform a disparity vector derivation process, the video coder may, for a neighboring block, only check whether a motion vector of the neighboring block corresponding to a first reference picture list (e.g., RefPicList0 or RefPicList1) is a disparity motion vector, regardless of whether the neighboring block has a motion vector corresponding to a second reference picture list (e.g., RefPicList0 or RefPicList1). Furthermore, in this example, when the motion vector of the neighboring block corresponding to the first reference picture list is a disparity motion vector, the video coder may convert the disparity motion vector to the disparity vector for the representative block.

Figure 17:
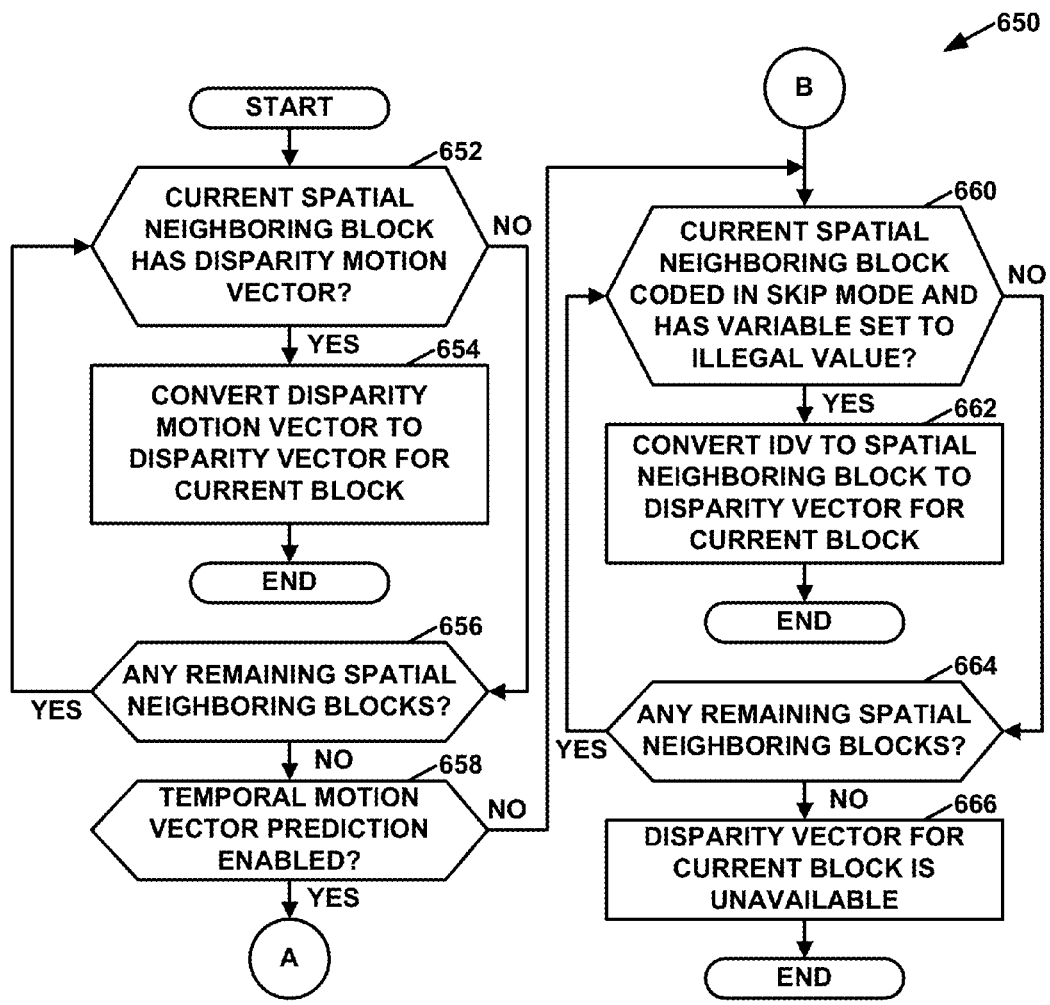
FIG. 17 is a flowchart illustrating an example operation of a video coder to determine a disparity vector for a current block, in accordance with one or more techniques of this disclosure.

FIG. 17 is a flowchart illustrating an example operation 650 of a video coder to determine a disparity vector for a current block, in accordance with one or more techniques of this disclosure. In some examples, such as the examples of FIGS. 16 and 17, IDVs may be represented in a simple way, such that no flag is used to signal whether a neighboring block contains an IDV. Rather, in such examples, a video coder may set one or more existing variables of the neighboring block (e.g., the reference index, the reference view index, etc.) to indicate that the neighboring block contains an IDV.

As shown in the example of FIG. 17, a video coder (e.g., video encoder 20 or video decoder 30) may determine whether a current spatial neighboring block has a disparity motion vector (652). In response to determining that the current spatial neighboring block has a disparity motion vector ("YES" of 652), the video coder may convert the disparity motion vector of the current spatial neighboring block to a disparity vector for the current block (654). After converting the disparity motion vector to the disparity vector, operation 650 ends.

On the other hand, in response to determining that the current spatial neighboring block does not have a disparity motion vector ("NO" of 652), the video coder may determine whether there are any remaining spatial neighboring blocks (660). In response to determining that there are one or more spatial neighboring blocks ("YES" of 660), the video coder may repeat actions 652-656 with regard to another one of the spatial neighboring blocks. In this way, the video coder may perform actions 652-656 until the video coder has either all of the spatial neighboring blocks or identified a spatial motion vector. The video coder may check the spatial neighboring blocks in the order of $A_1$, $B_1$, $B_0$, $A_0$ and $B_2$.

In response to determining that there are no remaining spatial neighboring blocks ("NO" of 656), the video coder may determine whether temporal motion vector prediction is enabled (658). If the video coder determines that temporal motion vector prediction is enabled ("YES" of 658), the video coder may perform the portion of operation 650 shown in FIG. 18 (indicated in FIG. 17 as "A"). After performing the portion of operation 650 shown in FIG. 18 or after determining that temporal motion vector prediction is not enabled ("NO" of 658), the video coder may check the spatial neighboring blocks for an IDV. The video coder may check the spatial neighboring blocks in the order of $A_0$, $A_1$, $B_0$, $B_1$ and $B_2$. Thus, in the example of FIG. 17, the video coder may determine whether a current spatial neighboring block is coded in skip mode and has a particular variable set to the illegal value (660). If the particular variable for the current spatial neighboring block is set to the illegal value, the current spatial neighboring block has an IDV. For example, prior to determining the disparity vector for the current block, the video coder has already coded the current spatial neighboring block. As part of coding the current spatial neighboring block, the video coder may perform a motion prediction process (e.g., a merge mode process or an AMVP process) to determine motion information for the current spatial neighboring block. In 3D-HEVC Working Draft 1, when the video coder performs the motion prediction process, the video coder sets an inter-view prediction motion vector flag (e.g., IvpMvFlagLX) to indicate whether the current spatial neighboring block has an IDV. However, in accordance with one or more techniques of this disclosure, the video coder may set the particular variable of the current spatial neighboring block to an illegal value in order to indicate that the current spatial neighboring block has an IDV. As indicated above, the particular variable may be a reference index, a reference view index, and other variable. After the video coder has determined the motion information for the current spatial neighboring block, the video coder may not need the particular variable again. Accordingly, the particular variable can be reused to indicate whether the current spatial neighboring block has the IDV.

In response to determining that the current spatial neighboring block is coded in skip mode and has the particular variable set to the illegal value ("YES" of 660), the video coder may convert the IDV of the current spatial neighboring block to the disparity vector for the current block (662). After converting the IDV of the current spatial neighboring block to the disparity vector for the current block, operation 650 ends.

On the other hand, in response to determining that the current spatial neighboring block is not coded in skip mode or that the particular variable for the current spatial neighboring block is not set to the illegal value ("NO" of 660), the video coder may determine whether there are any remaining spatial neighboring blocks (664). In response to determining that there are one or more remaining spatial neighboring blocks ("YES" of 664), the video coder may repeat actions 660-664 with one of the remaining spatial neighboring blocks as the current spatial neighboring block.

In response to determining that there are no remaining spatial neighboring blocks ("NO" of 664), the video coder may indicate that the disparity vector for the current block is unavailable (666). Operation 650 may then end.

Figure 18:
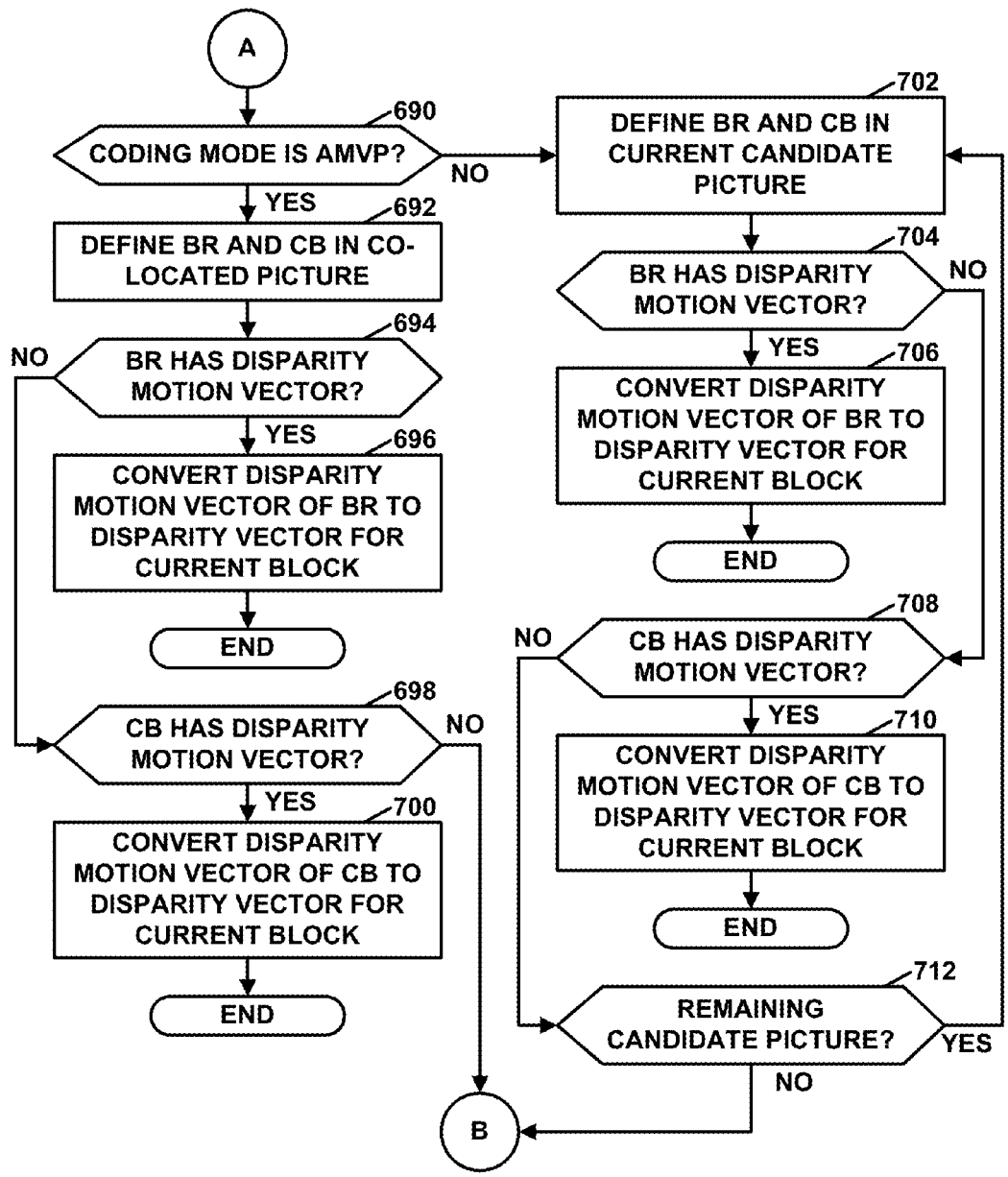
FIG. 18 is a flowchart illustrating an example continuation of the operation shown in FIG. 17.

FIG. 18 is a flowchart illustrating an example continuation of operation 650 shown in FIG. 17. As shown in the example of FIG. 18, the video coder may determine whether the coding mode of the current block is AMVP (690). In response to determining that the coding mode is AMVP ("YES" of 690), the video coder may define BR and CB regions in the co-located picture (692). Next, the video coder may determine whether a block (e.g., a PU) covering the BR region has a disparity motion vector (694). In response to determining that the block covering the BR region has a disparity motion vector ("YES" of 694), the video coder may convert the disparity motion vector of the block covering the BR region to the disparity vector for the current block (696). The video coder may then end the disparity vector derivation process of operation 650.

On the other hand, in response to determining that the block covering the BR region does not have a disparity motion vector ("NO" of 694), the video coder may determine whether a block covering the CB region has a disparity motion vector (698). In response to determining that the block covering the CB region has a disparity motion vector ("YES" of 698), the video coder may convert the disparity motion vector of the block covering the CB region to the disparity vector of the current block (700). The video coder may then end the disparity vector derivation process of operation 650. However, if the block covering the CB region does not have a disparity motion vector ("NO" of 698), the video coder may perform the portion of operation 650 shown in FIG. 17 following circle marked "B."

In response to determining that the coding mode is not AMVP ("NO" of 690), the video coder may define BR and CB regions in a current co-located picture in a candidate picture list (702). Next, the video coder may determine whether a block (e.g., the PU) covering the BR region of the current candidate picture has a disparity motion vector (704). In response to determining that the block covering the BR region of the current candidate picture has a disparity motion vector ("YES" of 704), the video coder may convert the disparity motion vector of the block covering the BR region of the current candidate picture to the disparity vector for the current block (706). The video coder may then end the disparity vector derivation process of operation 650.

On the other hand, in response to determining that the block covering the BR region of the current candidate picture does not have a disparity motion vector ("NO" of 704), the video coder may determine whether a block covering the CB region of the current candidate picture has a disparity motion vector (708). In response to determining that the block covering the CB region of the current candidate picture has a disparity motion vector ("YES" of 708), the video coder may convert the disparity motion vector of the block covering the CB region of the current candidate picture to the disparity vector of the current block (710). The video coder may then end the disparity vector derivation process of operation 650.

However, in response to determining that the block covering the CB region of the current candidate picture does not have a disparity motion vector ("NO" of 708), the video coder may determine whether there are any remaining candidate pictures in the candidate picture list (712). In response to determining that there are one or more remaining candidate pictures in the candidate picture list ("YES" of 712), the video coder may perform action 702-712 with another one of the candidate pictures as the current candidate picture. On the other hand, in response to determining that there are no remaining candidate pictures in the candidate picture list ("NO" of 712), the video coder may perform the portion of operation 650 shown in FIG. 17 following circle marked "B."

EXAMPLE 1

A method of coding video data, the method comprising: determining a disparity vector for a coding unit (CU) of video data that includes one or more prediction units (PUs), wherein the disparity vector is common to each of the one or more PUs of the CU; and performing one or more of inter-view motion prediction and inter-view residual prediction for the CU based on the determined disparity vector.

EXAMPLE 2

The method of example 1, the method further comprising adopting the disparity vector as a disparity motion vector, wherein performing the one or more of the inter-view motion prediction and the inter-view residual prediction for the CU based on the determined disparity vector comprises performing one or more of the inter-view motion prediction and the inter-view residual prediction for the CU using the disparity motion vector.

EXAMPLE 3

The method of example 1, wherein determining the disparity vector for the CU comprises determining the disparity vector based on one of a disparity motion vector (DMV) and an implicit disparity vector (IDV) associated with a reference block of video data.

EXAMPLE 4

The method of example 3, wherein the reference block comprises one of: a spatial neighboring block associated with the CU; and a temporal neighboring block associated with the CU.

EXAMPLE 5

The method of example 4, wherein the CU comprises one of a plurality of CUs of a frame of video data, and wherein the spatial neighboring block comprises a block of video data that is included within another CU of the plurality of CUs, other than the CU, and that is located adjacent to the CU within the frame.

EXAMPLE 6

The method of example 4, wherein the CU comprises one of a first plurality of CUs of a first frame of video data, and wherein the temporal neighboring block comprises a block of video data that is included within a second frame of video data, wherein the first frame is different than the second frame.

EXAMPLE 7

The method of example 6, wherein the block that is included within the second frame comprises one of: a block of video data that is included within a CU of a second plurality of CUs of the second frame, wherein the CU of the second plurality of CUs of the second frame is collocated with the CU of the first plurality of CUs of the first frame; and a block of video data that is located adjacent to the CU of the second plurality of CUs of the second frame.

EXAMPLE 8

The method of example 3, wherein the CU comprises one of a plurality of CUs of a frame of video data, and wherein the reference block comprises one of the following: a first neighboring PU included within a first CU of the plurality of CUs, other than the CU, that is located adjacent to a bottom-left corner of the CU within the frame; a second neighboring PU included within a second CU of the plurality of CUs, other than the CU, that is located directly to the left of the CU within the frame; a third neighboring PU included within a third CU of the plurality of CUs, other than the CU, that is located adjacent to a top left corner of the CU within the frame; a fourth neighboring PU included within a fourth CU of the plurality of CUs, other than the CU, that is located directly on top of the CU within the frame; and a fifth neighboring PU included within a fifth CU of the plurality of CUs, other than the CU, that is located adjacent to a top right corner of the CU within the frame.

EXAMPLE 9

The method of example 8, wherein the reference block comprises one of a subset of the first neighboring PU, the second neighboring PU, the third neighboring PU, the fourth neighboring PU, and the fifth neighboring PU.

EXAMPLE 10

The method of example 3, wherein the reference block comprises one of: a first region of a second frame of video data that is included within a portion of the second frame that is collocated with the CU; a second region of the second frame that is included within a portion of the second frame that is collocated with a PU of the CU; a third region of the second frame that corresponds to a largest CU (LCU) of the second frame, and that includes one or both of the first region and the second region; and a fourth region of the second frame that is located adjacent to a bottom right corner of one or more of the first region and the second region.

EXAMPLE 11

The method of example 3, wherein the reference block comprises a PU of one of a spatial neighboring CU and a temporal neighboring CU, other than the CU, of the CU.

EXAMPLE 12

The method of example 3, wherein the reference block is determined based on a representative PU of the plurality of PUs of the CU.

EXAMPLE 13

The method of example 3, wherein the disparity motion vector is determined by determining one of a disparity motion vector and an implicit disparity vector of each of one or more reference blocks associated with the CU according to a predetermined order.

EXAMPLE 14

The method of example 13, wherein the predetermined order is defined based on an amount of correlation between the CU and each of the one or more reference blocks.

EXAMPLE 15

The method of example 1, further comprising:
indicating whether an implicit disparity vector (IDV) is present for a reference block associated with the CU by signaling one of: a reference index; a reference view index; a difference of a reference view index; an illegal reference index; an illegal reference view index; and a difference of an illegal reference view index.

EXAMPLE 16

The method of example 15, further comprising avoiding indicating whether the IDV is present for the reference block using a single-bit flag.

EXAMPLE 17

The method of any combination of examples 1-16.

EXAMPLE 18

The method of any of examples 1-16 or combinations thereof, wherein the method is performed by an encoder.

EXAMPLE 19

The method of any of examples 1-16 or combinations thereof, wherein the method is performed by a decoder.

EXAMPLE 20

A system configured to perform the method of any of examples 1-16 or combinations thereof.

EXAMPLE 21

A non-transitory computer readable storage medium comprising instructions that when executed cause one or more processors to perform the method of any of examples 1-16 or combinations thereof.

EXAMPLE 22

A video encoding device configured to perform the method of any of examples 1-16 or combinations thereof.

EXAMPLE 23

A video decoding device configured to perform the method of any of example 1-16 or combinations thereof.

EXAMPLE 24

A device for coding video data, comprising: means for determining a disparity vector for a coding unit (CU) of video data that includes one or more prediction units (PUs), wherein the disparity vector is common to each of the one or more PUs of the CU; and means for performing one or more of inter-view motion prediction and inter-view residual prediction for the CU based on the determined disparity vector.

EXAMPLE 25

The device of example 24, further comprising means for adopting the disparity vector as a disparity motion vector, wherein the means for performing the one or more of the inter-view motion prediction and the inter-view residual prediction for the CU based on the determined disparity vector comprise means for performing one or more of the inter-view motion prediction and the inter-view residual prediction for the CU using the disparity motion vector.

EXAMPLE 26

The device of example 24, wherein the means for determining the disparity vector for the CU comprise means for determining the disparity vector based on one of a disparity motion vector (DMV) and an implicit disparity vector (IDV) associated with a reference block of video data.

EXAMPLE 27

The device of example 26, wherein the reference block comprises one of: a spatial neighboring block associated with the CU; and a temporal neighboring block associated with the CU.

EXAMPLE 28

The device of example 27, wherein the CU comprises one of a plurality of CUs of a frame of video data, and wherein the spatial neighboring block comprises a block of video data that is included within another CU of the plurality of CUs, other than the CU, and that is located adjacent to the CU within the frame.

EXAMPLE 29

The device of example 27, wherein the CU comprises one of a first plurality of CUs of a first frame of video data, and wherein the temporal neighboring block comprises a block of video data that is included within a second frame of video data, wherein the first frame is different than the second frame.

EXAMPLE 30

The device of example 29, wherein the block that is included within the second frame comprises one of: a block of video data that is included within a CU of a second plurality of CUs of the second frame, wherein the CU of the second plurality of CUs of the second frame is collocated with the CU of the first plurality of CUs of the first frame; and a block of video data that is located adjacent to the CU of the second plurality of CUs of the second frame.

EXAMPLE 31

The device of example 26, wherein the CU comprises one of a plurality of CUs of a frame of video data, and wherein the reference block comprises one of the following: a first neighboring PU included within a first CU of the plurality of CUs, other than the CU, that is located adjacent to a bottom-left corner of the CU within the frame; a second neighboring PU included within a second CU of the plurality of CUs, other than the CU, that is located directly to the left of the CU within the frame; a third neighboring PU included within a third CU of the plurality of CUs, other than the CU, that is located adjacent to a top left corner of the CU within the frame; a fourth neighboring PU included within a fourth CU of the plurality of CUs, other than the CU, that is located directly on top of the CU within the frame; and a fifth neighboring PU included within a fifth CU of the plurality of CUs, other than the CU, that is located adjacent to a top right corner of the CU within the frame.

EXAMPLE 32

The device of example 31, wherein the reference block comprises one of a subset of the first neighboring PU, the second neighboring PU, the third neighboring PU, the fourth neighboring PU, and the fifth neighboring PU.

EXAMPLE 33

The device of example 26, wherein the reference block comprises one of: a first region of a second frame of video data that is included within a portion of the second frame that is collocated with the CU; a second region of the second frame that is included within a portion of the second frame that is collocated with a PU of the CU; a third region of the second frame that corresponds to a largest CU (LCU) of the second frame, and that includes one or both of the first region and the second region; and a fourth region of the second frame that is located adjacent to a bottom right corner of one or more of the first region and the second region.

EXAMPLE 34

The device of example 26, wherein the reference block comprises a PU of one of a spatial neighboring CU and a temporal neighboring CU, other than the CU, of the CU.

EXAMPLE 35

The device of example 26, wherein the reference block is determined based on a representative PU of the plurality of PUs of the CU.

EXAMPLE 36

The device of example 26, wherein the means for determining the disparity motion vector comprise means for determining one of a disparity motion vector and an implicit disparity vector of each of one or more reference blocks associated with the CU according to a predetermined order.

EXAMPLE 37

The device of example 36, wherein the predetermined order is defined based on an amount of correlation between the CU and each of the one or more reference blocks.

EXAMPLE 38

The device of example 24, further comprising: means for indicating whether an implicit disparity vector (IDV) is present for a reference block associated with the CU by signaling one of: a reference index; a reference view index; a difference of a reference view index; an illegal reference index; an illegal reference view index; and a difference of an illegal reference view index.

EXAMPLE 39

The device of example 38, further comprising means for avoiding indicating whether the IDV is present for the reference block using a single-bit flag.

EXAMPLE 40

Any device or method described in this disclosure.

Any details of any of the examples above may be combined with other examples, consistent with this disclosure. In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
performing, by one or more processors or circuits, a disparity vector derivation process to derive a disparity vector for a current block of the video data, wherein performing the disparity vector derivation process comprises:

when either a first or a second spatial neighboring block has a disparity motion vector or an implicit disparity vector, converting, by the one or more processors or circuits, the disparity motion vector or the implicit disparity vector to the disparity vector for the current block, wherein the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector; and reconstructing, by the one or more processors or circuits, a sample block for the current block in part by performing, based on the derived disparity vector, inter-view motion prediction for the current block, wherein the current block is in a first view and performing inter-view motion prediction comprises:

identifying, by the one or more processors or circuits, based on the derived disparity vector, a corresponding block in a second view different from the first view; and using, by the one or more processors or circuits, motion vectors of the corresponding block as a candidate of a list, wherein the list is in a group consisting of a merge list for the current block and an Advanced Motion Vector Prediction (AMVP) candidate list for the current block.

2. The method of claim 1, wherein the first spatial neighboring block is adjacent to a top edge of the current block and the second spatial neighboring block is adjacent to a left edge of the current block.

3. The method of claim 2, wherein performing the disparity vector derivation process comprises checking, by the one or more processors or circuits, the first spatial neighboring block for a disparity motion vector and then checking the second spatial neighboring block for a disparity motion vector.

4. The method of claim 2, wherein performing the disparity vector derivation process comprises checking, by the one or more processors or circuits, the second spatial neighboring block for a disparity motion vector and then checking the first spatial neighboring block for a disparity motion vector.

5. A method of encoding video data, the method comprising:

performing, by one or more processors or circuits, a disparity vector derivation process to derive a disparity vector for a current block of the video data, wherein performing the disparity vector derivation process comprises:

when either a first or a second spatial neighboring block has a disparity motion vector or an implicit disparity vector, converting the disparity motion vector or the implicit disparity vector to the disparity vector for the current block, wherein the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector; and generating, by the one or more processors or circuits, based in part on the derived disparity vector for the current block, an encoded representation of the current block, wherein the current block is in a first view and generating the encoded representation of the current block comprises performing inter-view motion prediction, wherein performing inter-view motion prediction comprises:

identifying, by the one or more processors or circuits, based on the derived disparity vector, a corresponding block in a second view different from the first view; and using, by the one or more processors or circuits, motion vectors of the corresponding block as a candidate of a list, wherein the list is in a group consisting of a merge list for the current block and an Advanced Motion Vector Prediction (AMVP) candidate list for the current block.

6. The method of claim 5, wherein the first spatial neighboring block is adjacent to a top edge of the current block and the second spatial neighboring block is adjacent to a left edge of the current block.

7. The method of claim 6, wherein performing the disparity vector derivation process comprises checking, by the one or more processors or circuits, the first spatial neighboring block for a disparity motion vector and then checking the second spatial neighboring block for a disparity motion vector.

8. The method of claim 6, wherein performing the disparity vector derivation process comprises checking, by the one or more processors or circuits, the second spatial neighboring block for a disparity motion vector and then checking the first spatial neighboring block for a disparity motion vector.

9. A device for encoding or decoding video data, the device comprising:

a memory configured to store the video data; and
one or more processors configured to
perform a disparity vector derivation process to derive a disparity vector for a current block of the video data, wherein performing the disparity vector derivation process comprises:

when either a first or a second spatial neighboring block has a disparity motion vector or an implicit disparity vector, converting the disparity motion vector or the implicit disparity vector to the disparity vector for the current block, wherein the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector, perform one of:

reconstruct a sample block for the current block in part by performing, based on the derived disparity vector, inter-view motion prediction for the current block; or generate an encoded representation of the current block in part by performing, based in part on the derived disparity vector, inter-view motion prediction for the current block, wherein the current block is in a first view and the one or more processors are configured such that, as part of performing inter-view motion prediction for the current block, the one or more processors:

identify, based on the derived disparity vector, a corresponding block in a second view different from the first view; and use motion vectors of the corresponding block as a candidate of a list, wherein the list is in a group consisting of a merge list for the current block and an Advanced Motion Vector Prediction (AMVP) candidate list for the current block.

10. The device of claim 9, wherein the first spatial neighboring block is adjacent to a top edge of the current block and the second spatial neighboring block is adjacent to a left edge of the current block.

11. The device of claim 10, wherein the one or more processors are configured such that, when the one or more processors perform the disparity vector derivation process, the one or more processors check the first spatial neighboring block for a disparity motion vector and then check the second spatial neighboring block for a disparity motion vector.

12. The device of claim 10, wherein the one or more processors are configured such that, when the one or more processors perform the disparity vector derivation process, the one or more processors check the second spatial neighboring block for a disparity motion vector and then check the first spatial neighboring block for a disparity motion vector.

13. A device for encoding or decoding video data, the device comprising:
 means for performing a disparity vector derivation process to derive a disparity vector for a current block of the video data, wherein performing the disparity vector derivation process comprises:
  when either a first or a second spatial neighboring block has a disparity motion vector or an implicit disparity vector, converting the disparity motion vector or the implicit disparity vector to the disparity vector for the current block,
  wherein the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector; and
 means for using the disparity vector for the current block to perform inter-view motion prediction; and
 one of:
  means for reconstructing a sample block for the current block in part by performing, based on the derived disparity vector, inter-view motion prediction for the current block; or
  means for generating an encoded representation of the current block in part by performing, based in part on the derived disparity vector, inter-view motion prediction for the current block,
 wherein the current block is in a first view and the means for reconstructing the sample block or the means for generating the encoded representation of the current block comprises:
  means for identifying, based on the derived disparity vector, a corresponding block in a second view different from the first view; and
  means for using motion vectors of the corresponding block as a candidate of a list, wherein the list is in a group consisting of a merge list for the current block and an Advanced Motion Vector Prediction (AMVP) candidate list for the current block.

14. The device of claim 13, wherein the first spatial neighboring block is adjacent to a top edge of the current block and the second spatial neighboring block is adjacent to a left edge of the current block.

15. A non-transitory computer-readable data storage medium having instructions stored thereon that when executed cause one or more processors to:
 perform a disparity vector derivation process to derive a disparity vector for a current block, wherein performing the disparity vector derivation process comprises:
  when either a first or a second spatial neighboring block has a disparity motion vector or an implicit disparity vector, converting the disparity motion vector or the implicit disparity vector to the disparity vector for the current block,
  wherein the disparity vector derivation process does not determine whether any spatial neighboring blocks in addition to the first and second spatial neighboring blocks have disparity motion vectors or implicit disparity vectors even if neither of the first or the second spatial neighboring blocks has a disparity motion vector or an implicit disparity vector; and
 perform one of:
  reconstruct a sample block for the current block in part by performing, based on the derived disparity vector, inter-view motion prediction for the current block; or
  generate an encoded representation of the current block in part by performing, based in part on the derived disparity vector, inter-view motion prediction for the current block,
 wherein the current block is in a first view and the one or more processors are configured such that, as part of performing inter-view motion prediction for the current block, the one or more processors:
  identify, based on the derived disparity vector, a corresponding block in a second view different from the first view; and
  use motion vectors of the corresponding block as a candidate of a list, wherein the list is in a group consisting of a merge list for the current block and an Advanced Motion Vector Prediction (AMVP) candidate list for the current block.

16. The non-transitory computer-readable data storage medium of claim 15, wherein the first spatial neighboring block is adjacent to a top edge of the current block and the second spatial neighboring block is adjacent to a left edge of the current block.

17. The device of claim 9, wherein the device comprises at least one of:
 an integrated circuit;
 a microprocessor; or
 a wireless communication device.

18. The device of claim 9, further comprising a display configured to display decoded video data.

19. The device of claim 9, further comprising a camera configured to capture the video data.

* * * * *